(12) United States Patent
Ryu et al.

(10) Patent No.: US 12,707,292 B2
(45) Date of Patent: Aug. 11, 2026

(54) ON DEMAND SYSTEM INFORMATION BLOCK 1 CONFIGURATIONS

(71) Applicant: QUALCOMM Incorporated, San Diego, CA (US)

(72) Inventors: Jae Ho Ryu, San Diego, CA (US); Hung Dinh Ly, San Diego, CA (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/626,292

(22) Filed: Apr. 3, 2024

(65) Prior Publication Data

US 2025/0317753 A1 Oct. 9, 2025

(51) Int. Cl.

| | |
|---|---|
| ***H04W 24/02*** | (2009.01) |
| ***H04W 56/00*** | (2009.01) |
| ***H04W 72/04*** | (2023.01) |
| ***H04W 72/0453*** | (2023.01) |
| ***H04W 72/232*** | (2023.01) |
| ***H04W 74/0833*** | (2024.01) |
| ***H04W 76/20*** | (2018.01) |

(52) U.S. Cl.

CPC ....... *H04W 24/02* (2013.01); *H04W 56/0015* (2013.01); *H04W 72/0453* (2013.01); *H04W 72/232* (2023.01); *H04W 74/0833* (2013.01); *H04W 76/20* (2018.02)

(58) Field of Classification Search

None

See application file for complete search history.

(56) References Cited

U.S. PATENT DOCUMENTS

| | | | | |
|---|---|---|---|---|
| 2019/0349838 | A1* | 11/2019 | Futaki | H04W 48/08 |
| 2023/0030254 | A1* | 2/2023 | Basu Mallick | H04L 5/0053 |
| 2023/0144750 | A1* | 5/2023 | Agiwal | H04W 48/12 455/422.1 |
| 2023/0217386 | A1* | 7/2023 | Orsino | H04W 48/12 370/503 |
| 2023/0300725 | A1* | 9/2023 | Basu Mallick | H04W 48/14 370/329 |
| 2024/0422856 | A1* | 12/2024 | Lauridsen | H04W 76/27 |

(Continued)

OTHER PUBLICATIONS

3GPP: "3rd Generation Partnership Project, Technical Specification Group Radio Access Network, NR, User Equipment (UE) procedures in Idle mode and RRC Inactive state(Release 18)", 3GPP TS 38.304, V18.0.0, Dec. 2023, pp. 1-54.

(Continued)

*Primary Examiner* — Duc T Duong

(74) *Attorney, Agent, or Firm* — Dinsmore & Sholhl LLP

(57) ABSTRACT

Certain aspects of the present disclosure provide techniques for on demand system information block 1 (OD-SIB1) transmission in non-anchor cells. A method includes receiving, in a first anchor cell of a first network entity, a first configuration for an OD-SIB1 procedure in a non-anchor cell, wherein the first configuration is common to a first plurality of non-anchor cells supporting OD-SIB1 transmission; sending, in a first non-anchor cell of the first plurality of non-anchor cells, a request to send an OD-SIB1 based at least in part on the first configuration; and receiving, in the first non-anchor cell, the OD-SIB1 based at least in part on the first configuration.

20 Claims, 16 Drawing Sheets

(56) References Cited

U.S. PATENT DOCUMENTS

| | | | | |
|---|---|---|---|---|
| 2025/0063477 | A1* | 2/2025 | Jung | H04W 48/10 |
| 2025/0112715 | A1* | 4/2025 | Cheng | H04B 17/327 |
| 2025/0254611 | A1* | 8/2025 | Keating | H04W 52/0245 |

OTHER PUBLICATIONS

3GPP TS 38.211: "3rd Generation Partnership Project, Technical Specification Group Radio Access Network, NR, Physical Channels and Modulation (Release 18)", 3GPP TS 38.211, V18.1.0, Dec. 2023, pp. 1-159.

* cited by examiner

One Frame (TDD)
10 ms
400
subframe
RB
slot
D D D D D D D D D D D D X U
subcarrier
OFDM symbol
slot
DMRS Rx
CSI-RS 430
PDCCH
SSS
PSS
PDSCH
PBCH
20 RBs
SS/PBCH Block system bandwidth RBs
One Frame (TDD)
10 ms
450
subframe
RB
slot
D X U U U U U U U U U U U U
subcarrier
OFDM symbol
slot
SRS
SRS Comb 0
SRS Comb 1
DMRS R

480
PUCCH
PUSCH msg1-FDM (e..g, number of ROs) = 3

1102

1104

```
MIB ::= SEQUENCE {
        systemFrameNumber           BIT STRING (SIZE(6)),
        subCarrierSpacingCommon             ENUMERATED {scs15or60, scs30or120},
        ssb-SubcarrierOffset        INTEGER (0 .. 15)
        dmrs-TypeA-Position         ENUMERATED {pos2, pos3},
        pdcch-ConfigSIB1            INTEGER (0 .. 255),
        cellBarred              ENUMERATED {barred, notBarred},
        intraFreqReselection        ENUMERATED {allowed, notAlllowed},
        spare                   BIT STRING (SIZE(1))
}
```

ON DEMAND SYSTEM INFORMATION BLOCK 1 CONFIGURATIONS

BACKGROUND

Field of the Disclosure

Aspects of the present disclosure relate to wireless communications, and more particularly, to techniques for on demand system information block 1 (OD-SIB1) transmission in non-anchor cells.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by an apparatus. The method includes receiving, in a first anchor cell of a first network entity, a first configuration for an on demand system information block 1 (OD-SIB1) procedure in a non-anchor cell, wherein the first configuration is common to a first plurality of non-anchor cells supporting OD-SIB1 transmission; sending, in a first non-anchor cell of the first plurality of non-anchor cells, a request to send an OD-SIB1 based at least in part on the first configuration; and receiving, in the first non-anchor cell, the OD-SIB1 based at least in part on the first configuration.

Another aspect provides a method for wireless communications by an apparatus. The method includes sending, in a first anchor cell of the apparatus, a first configuration for an OD-SIB1 procedure in a non-anchor cell, wherein the first configuration is common to a first plurality of non-anchor cells supporting OD-SIB1 transmission; receiving, in a first non-anchor cell of the first plurality of non-anchor cells and associated with the apparatus, a request to send an OD-SIB1 based at least in part on the first configuration; and sending, in the first non-anchor cell, the OD-SIB1 based at least in part on the first configuration.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
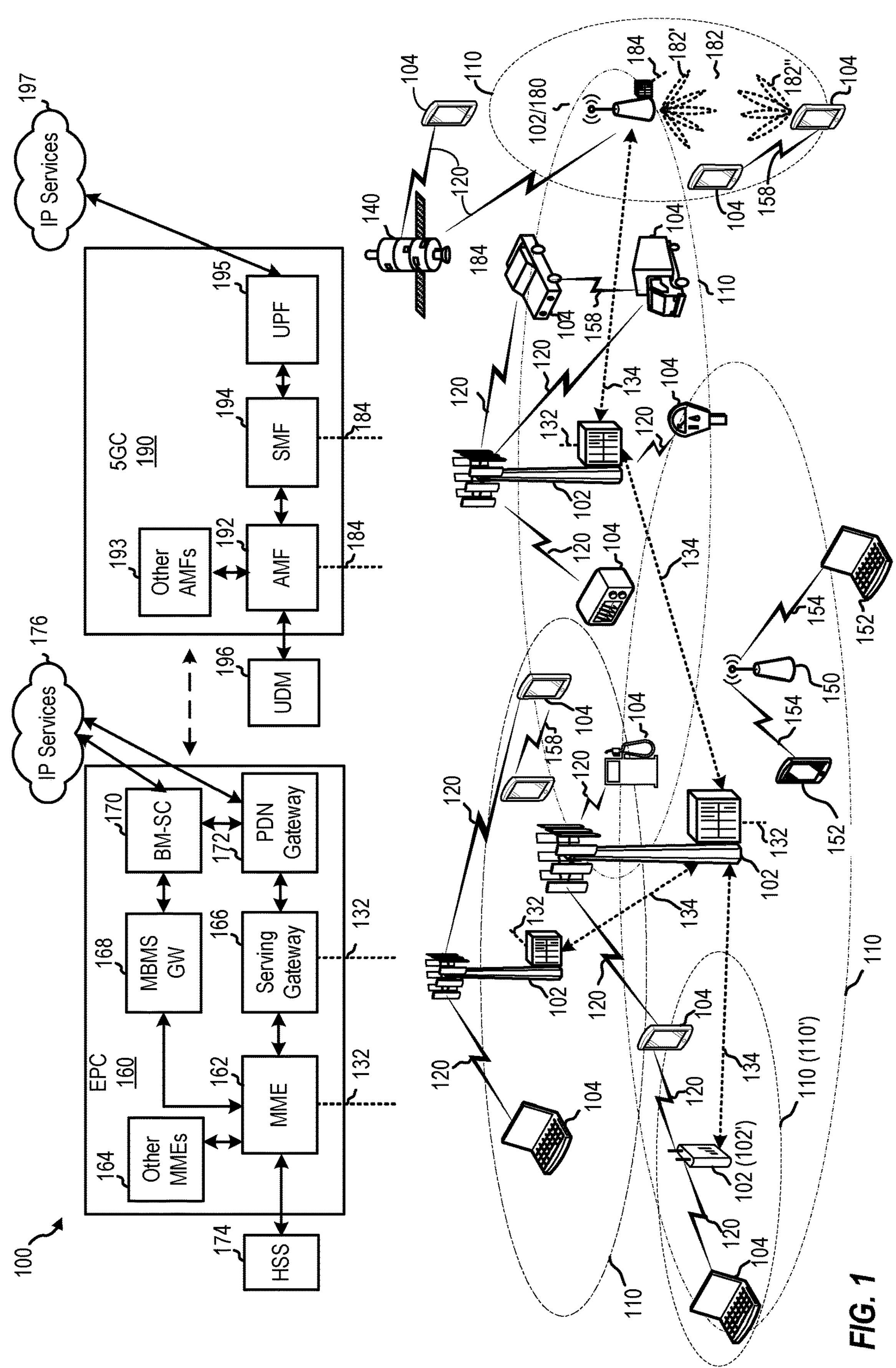
FIG. 1 depicts an example wireless communications network.

Aspects of the present disclosure provide apparatuses, methods, processing systems, and computer-readable mediums for on demand system information block 1 (OD-SIB1) communication in non-anchor cells.

System information blocks (SIBs), such as a SIB1, are broadcast messages in a wireless communications network that generally include information about the network configuration, cell identity, scheduling information, and/or other parameters required for user equipments (UEs) to access and connect to the wireless communications network. A network entity, providing communications coverage for a coverage area, the coverage area often referred to as a "cell," may periodically broadcast SIBs in the cell. This broadcasting concept may help to ensure that UEs geographically located within the cell receive updated and synchronized information.

SIB1 is one type of SIB broadcasted within a cell associated with a network entity. The SIB1 may carry basic information that a UE may use to perform initial attachment to the network entity. For example, the SIB1 may indicate or include information for enabling random access communications, such as defining a random access channel (RACH) for performing a random access procedure, a number of random access preambles (e.g., preamble sequences) available for random access, power ramping parameters, response window size, etc.

As used herein, a random access procedure (also commonly referred to as a "RACH procedure") is a process initiated between a UE and a network entity, which is used by the UE to obtain initial access to a radio access network (RAN) and request radio resources required for wireless communications. When a random access procedure is completed, a UE may transition to and be operating in a connected state (also referred to as a "connected mode," "radio resource control (RRC) connected mode," and/or "RRC connected state") to communicate with the network entity.

In some cases, a network entity may support a multi-carrier operation. For example, a network entity may use an anchor carrier for communications with UEs in an anchor cell. Further, the network entity may support an additional carrier, referred to as a "non-anchor carrier," for communications with UEs in one or more non-anchor cells (e.g., which may overlap with the anchor cell). The non-anchor carrier may beneficially increase network capacity among other things.

In some cases, the anchor carrier, as well as the non-anchor carrier, may be used by UEs and the network entity to perform random access procedures. For example, the network entity may support the periodic broadcast of SIB1s in the anchor cell to allow a UE to perform a random access procedure in the anchor cell using the anchor carrier associated with the network entity. Such periodic broadcast of SIB1s may not be desired in the non-anchor cell of the network entity, however, at least to network energy saving purposes. Thus, to enable a UE to establish an RRC connection with the network entity in the non-anchor cell, a non-anchor carrier associated with the network entity may be configured to support the transmission of OD-SIB1(s) in the non-anchor cell. For example, the network entity may transmit SIB1(s) in the non-anchor cell using the non-anchor carrier (e.g., associated with the non-anchor cell) based on receiving an instruction and/or a request for the OD-SIB1 from a UE. Transmission of OD-SIB1(s) in the non-anchor cell may enable the UE to perform a random access procedure with the network entity in the non-anchor cell. Enabling random access procedures in non-anchor cells beneficially helps to increase the overall capacity for random access, distribute network traffic between anchor and non-anchor cells (e.g., load balancing), improve the exchange of data between a UE and a network entity, and/or provide a mechanism for more quickly attaching to the RAN (e.g., as opposed to only supporting random access procedures in an anchor cell).

It should be noted that performing a random access procedure in a particular cell may refer to using a carrier associated with that cell for communicating RACH messages between a UE and a network entity. For example, performing a random access procedure in an anchor cell may refer to using an anchor carrier associated with the anchor cell for communicating RACH messages between a UE and a network entity. In another example, performing RACH in a non-anchor cell may refer to using a non-anchor carrier associated with the non-anchor cell for communicating RACH messages between a UE and a network entity.

In certain aspects, a UE may be provided with a configuration to perform such OD-SIB1 procedures in non-anchor cells. For example, in cases where a non-anchor cell supporting OD-SIB1 transmission is overlaid on an anchor cell associated with a network entity, the UE may be provided with an OD-SIB1 cell configuration for the non-anchor cell in the anchor cell. The OD-SIB1 cell configuration may include, for example, (1) a first configuration for sending one or more OD-SIB1 requests (e.g., as uplink wake-up signals (WUSs)) to the network entity in the non-anchor cell (e.g., an uplink WUS configuration) and (2) a second configuration for receiving one or more OD-SIB1s from the network entity in the non-anchor cell. Based on the first configuration, the UE may send, in the non-anchor cell, an OD-SIB1 request. Further, based on the second configuration, the UE may receive, in the non-anchor cell, the requested OD-SIB1.

Due to the cell-specific nature of the OD-SIB1 configuration, in cases where multiple non-anchor cells are overlaid on an anchor cell, the UE may be provided (e.g., in the anchor cell) with an OD-SIB1 cell configuration per non-anchor cell. Technical problems, such as increased signaling overhead and/or power consumption at the UE and the network entity, may occur as a result of needing to provide the UE with an OD-SIB1 cell configuration for each non-anchor cell (e.g., that supports OD-SIB1 transmission) separately.

Another technical problem associated with supporting OD-SIB1 procedures in non-anchor cells involves legacy UEs that do not support connection to non-anchor cells (e.g., that support OD-SIB1 transmission) attempting to establish an RRC connection in the non-anchor cells. For example, a legacy UE within a coverage area of a non-anchor cell supporting OD-SIB1 transmission may detect and receive an SSB in the non-anchor cell. The UE may decode the SSB and wait for a subsequent SIB1 transmission in the non-anchor cell. However, SIB1 transmission within the non-anchor cell may only be dynamically triggered. The legacy UE may not send a request for an OD-SIB1; thus, the legacy UE may never receive a SIB1 in the non-anchor cell for performing the random access procedure. As such, the UE may not be able to establish a connection with the network entity and may unnecessarily waster power by trying to decode a SIB1.

To overcome the aforementioned technical challenges and improve upon the state of the art, aspects described herein provide techniques that support the use of OD-SIB1 configurations common to a plurality of non-anchor cells supporting OD-SIB1 transmission. For example, a UE supporting OD-SIB1 procedures in non-anchor cells and within a coverage area of a non-anchor cell overlaid on an anchor cell of a network entity may receive a configuration for performing an OD-SIB1 procedure. The configuration may be provided to the UE in the anchor cell of the network entity. The configuration may be common to a plurality of non-anchor cells supporting OD-SIB1 transmission and on a same frequency layer (e.g., there may be one non-anchor carrier frequency in the deployment and the plurality of non-anchor cells may share the same frequency to cover a large geographical area).

In certain aspects, the OD-SIB1 configuration is common to non-anchor cells, supporting OD-SIB1 transmission, having overlapping coverage with a single anchor cell. In certain aspects, the OD-SIB1 configuration is common to non-anchor cells, supporting OD-SIB1 transmission, having overlapping coverage with a group of anchor cells, where the group of anchor cells includes two or more anchor cells.

Utilizing an OD-SIB1 configuration common to a plurality of non-anchor cells beneficially reduces signaling overhead while supporting OD-SIB1 procedures in non-anchor cells. For example, less signaling overhead may be realized as a result of not needing to send a new OD-SIB1 configuration to the UE each time the UE connects to a network entity in another non-anchor cell and/or another anchor cell, given the OD-SIB1 configuration is not designed to be cell-specific. Minimizing signaling overhead related to OD-SIB1 procedures beneficially reduces power consumption at the network entity and the UE.

Further, aspects described herein provide techniques that may be used to help prevent legacy UEs from attempting to establish a connection in a non-anchor cell that supports OD-SIB1 transmission. For example, in certain aspects, a synchronization signal block (SSB) broadcasted in a non-anchor cell, and including a master information block (MIB), may include a cellBarred field set to "barred." A legacy UE receiving this SSB and MIB with the cellBarred field set to "barred" may refrain from establishing an RRC connection in the non-anchor cell. Instead, in some cases after receiving the SSB and the MIB with the cellBarred field set to "barred," the legacy UE may attempt to establish an RRC connection with the network entity in an anchor cell of the network entity. Establishing the RRC connection in the anchor cell instead of the non-anchor cell may help to avoid the legacy UE wasting power in attempting to receive a SIB1 in the non-anchor cell when the SIB1 is not periodically broadcast in the non-anchor cell.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects (also referred to herein as non-terrestrial network entities), such as ground-based network entities (e.g., BSs 102), and non-terrestrial aspects, such as satellite 140 and/or aerial or spaceborne platform(s), which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, data centers, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Generally, a cell may refer to a portion, partition, or segment of wireless communication coverage served by a network entity within a wireless communication network. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
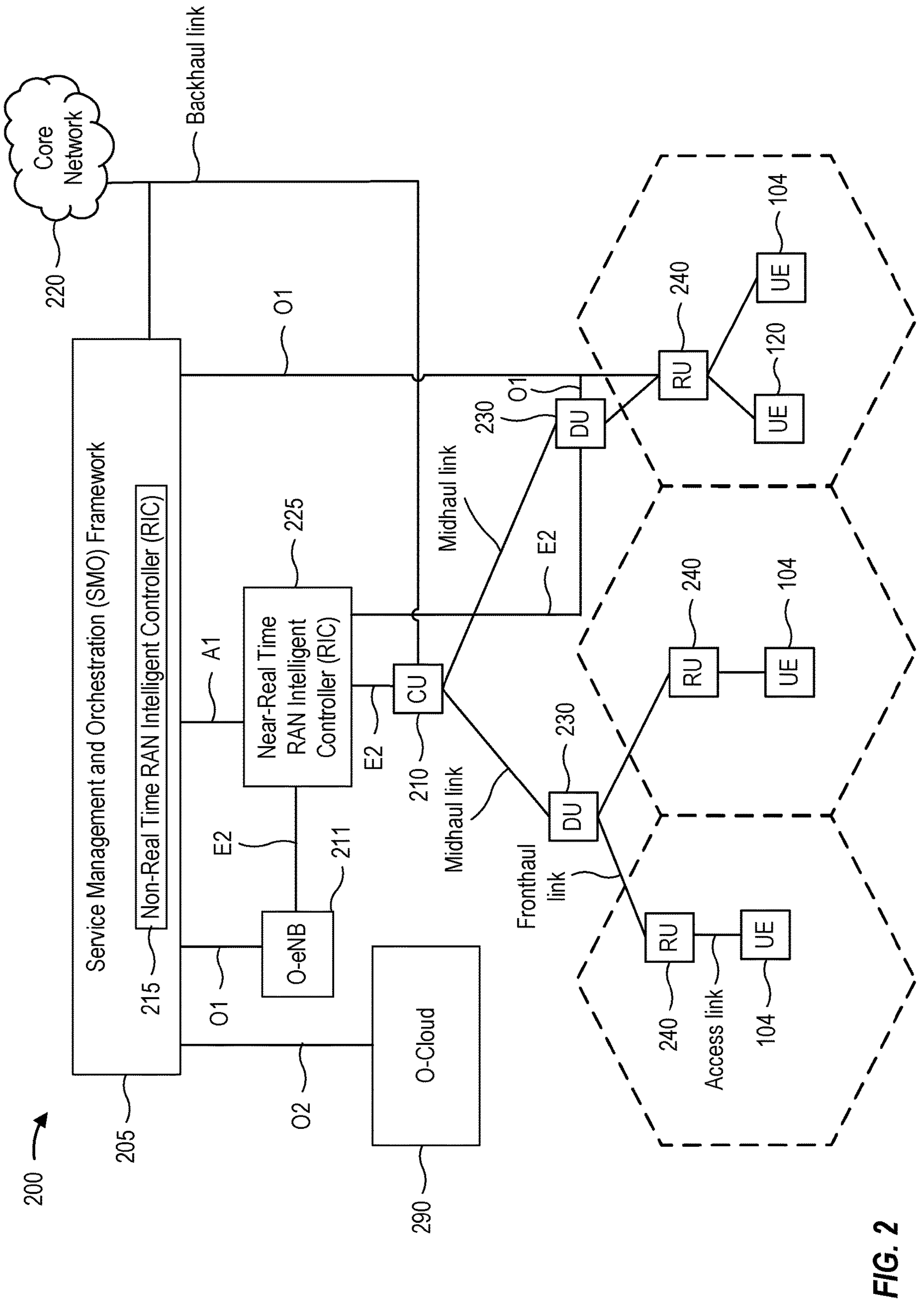
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-cNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
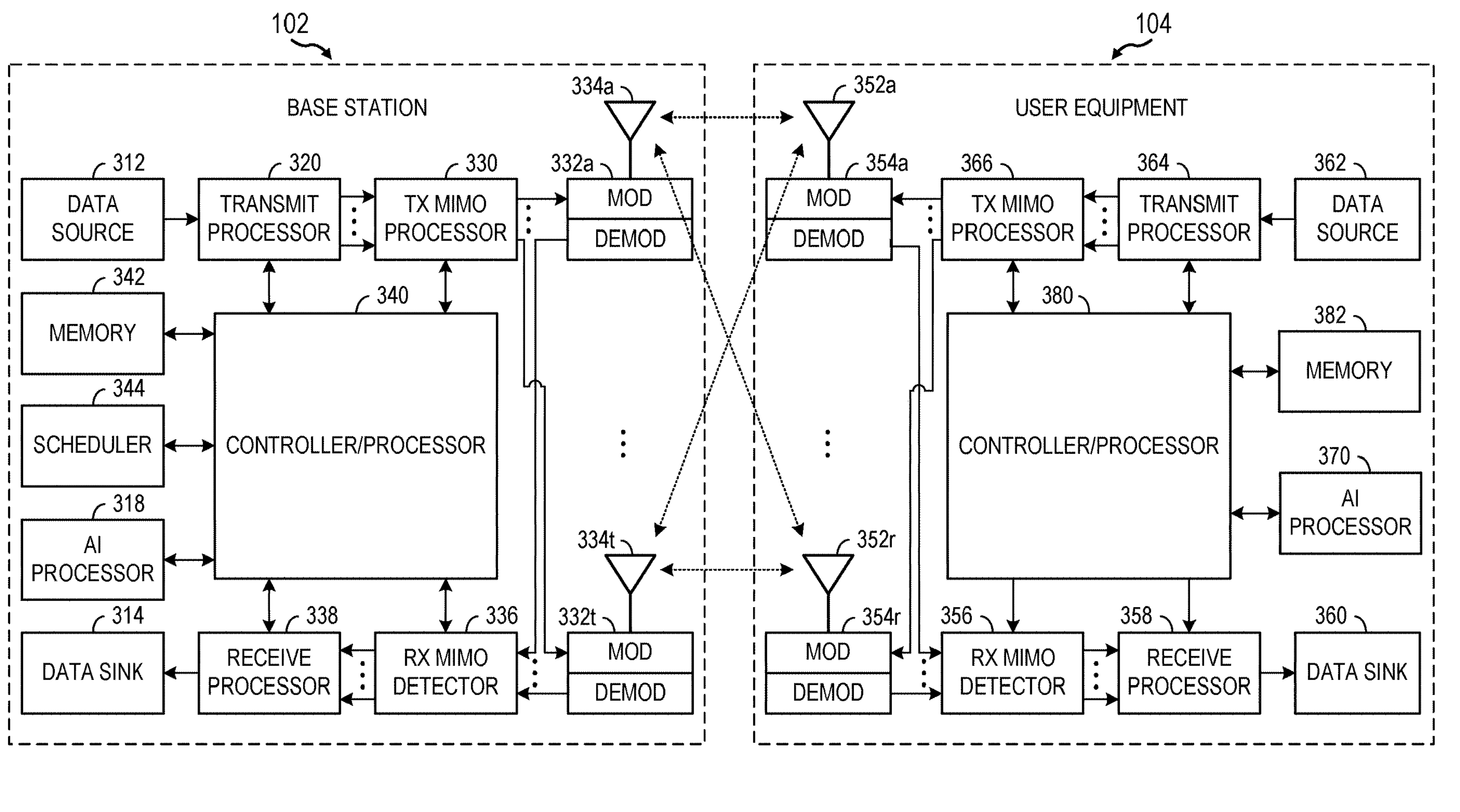
FIG. 3 depicts aspects of an example base station and an example user equipment (UE).

FIG. 3 depicts aspects of an example BS 102 and a UE 104.

Generally, BS 102 includes various processors (e.g., 318, 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 314). For example, BS 102 may send and receive data between BS 102 and UE 104. BS 102 includes controller/processor 340, which may be configured to implement various functions described herein related to wireless communications. Note that the BS 102 may have a disaggregated architecture as described herein with respect to FIG. 2.

Generally, UE 104 includes various processors (e.g., 358, 364, 366, 370, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a RX MIMO detector 336 if applicable, and further processed by a receive processor 338 to obtain decoded data and control information sent by UE 104. Receive processor 338 may provide the decoded data to a data sink 314 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

In various aspects, artificial intelligence (AI) processors 318 and 370 may perform AI processing for BS 102 and/or UE 104, respectively. The AI processor 318 may include AI accelerator hardware or circuitry such as one or more neural processing units (NPUs), one or more neural network processors, one or more tensor processors, one or more deep learning processors, etc. The AI processor 370 may likewise include AI accelerator hardware or circuitry. As an example, the AI processor 370 may perform AI-based beam management, AI-based channel state feedback (CSF), AI-based antenna tuning, and/or AI-based positioning (e.g., non-line of sight positioning prediction). In some cases, the AI processor 318 may process feedback from the UE 104 (e.g., CSF) using hardware accelerated AI inferences and/or AI training. The AI processor 318 may decode compressed CSF from the UE 104, for example, using a hardware accelerated AI inference associated with the CSF. In certain cases, the AI processor 318 may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figures 4A, 4B, 4C, 4D:
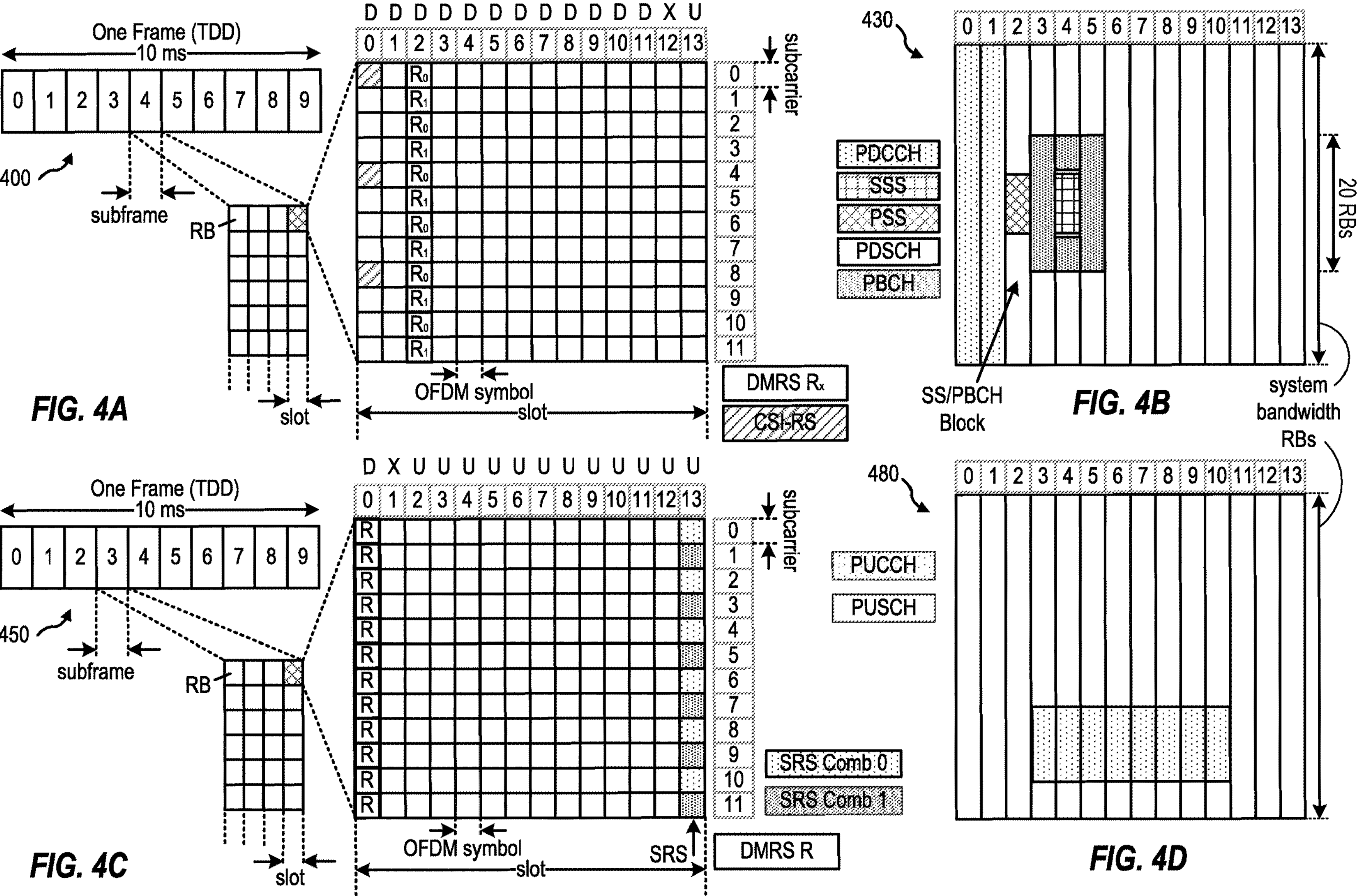
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology, which may define a frequency domain subcarrier spacing and symbol duration as further described herein. In certain aspects, given a numerology μ, there are $2^{\mu}$ slots per subframe. Thus, numerologies (μ) 0 to 6 may allow for 1, 2, 4, 8, 16, 32, and 64 slots, respectively, per subframe. In some cases, the extended CP (e.g., 12 symbols per slot) may be used with a specific numerology, e.g., numerology 2 allowing for 4 slots per subframe. The subcarrier spacing and symbol length/duration are a function of the numerology. The subcarrier spacing may be equal to $2^{\mu}\times15$ kHz, where u is the numerology 0 to 6. As an example, the numerology μ=0 corresponds to a subcarrier spacing of 15 kHz, and the numerology μ=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology μ=2 with 4 slots per subframe. In such a case, the slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Random Access Procedures

Certain wireless communication systems (e.g., an E-UTRA system, 5G NR system, 6G system, etc.) may provide a specified channel for random access, such as a RACH, and corresponding random access procedures. A UE may use the RACH for random access to a RAN to establish an RRC connection (e.g., transition to a connected state), for example. A random access procedure may be performed for any of various events including, for example, initial access from an idle state, RRC connection re-establishment, handover, downlink and/or uplink data arrival (e.g., when the UE is in an idle state), and/or device positioning.

As used herein, RRC states of a UE in a RAN include (1) a connected state (also referred to as a "connected mode," "RRC connected mode," and/or "RRC connected state"), (2) an inactive state (also referred to as an "inactive mode," "RRC inactive mode," and/or "RRC inactive state"), and (3) an idle state (also referred to as an "idle mode," "RRC idle mode," and/or "RRC idle state"). The UE may be operating in a connected state in the RAN after establishing an RRC connection with a network entity in the RAN. The UE may be operating in an idle state in the RAN when the UE is not connected, or in other words, does not have an established RRC connection with the network entity in the RAN. The UE may be operating in an inactive state in the RAN when the UE has an established RRC connection with the network entity in the RAN, but the connection is in a dormant, suspended, or inactive and there is no active communication between the UE and the network entity. For example, while operating in the inactive state, unlike the idle state, a non-access stratum (NAS) layer of an RRC connection established by the UE may continue to be connected.

Figures 5A, 5B:
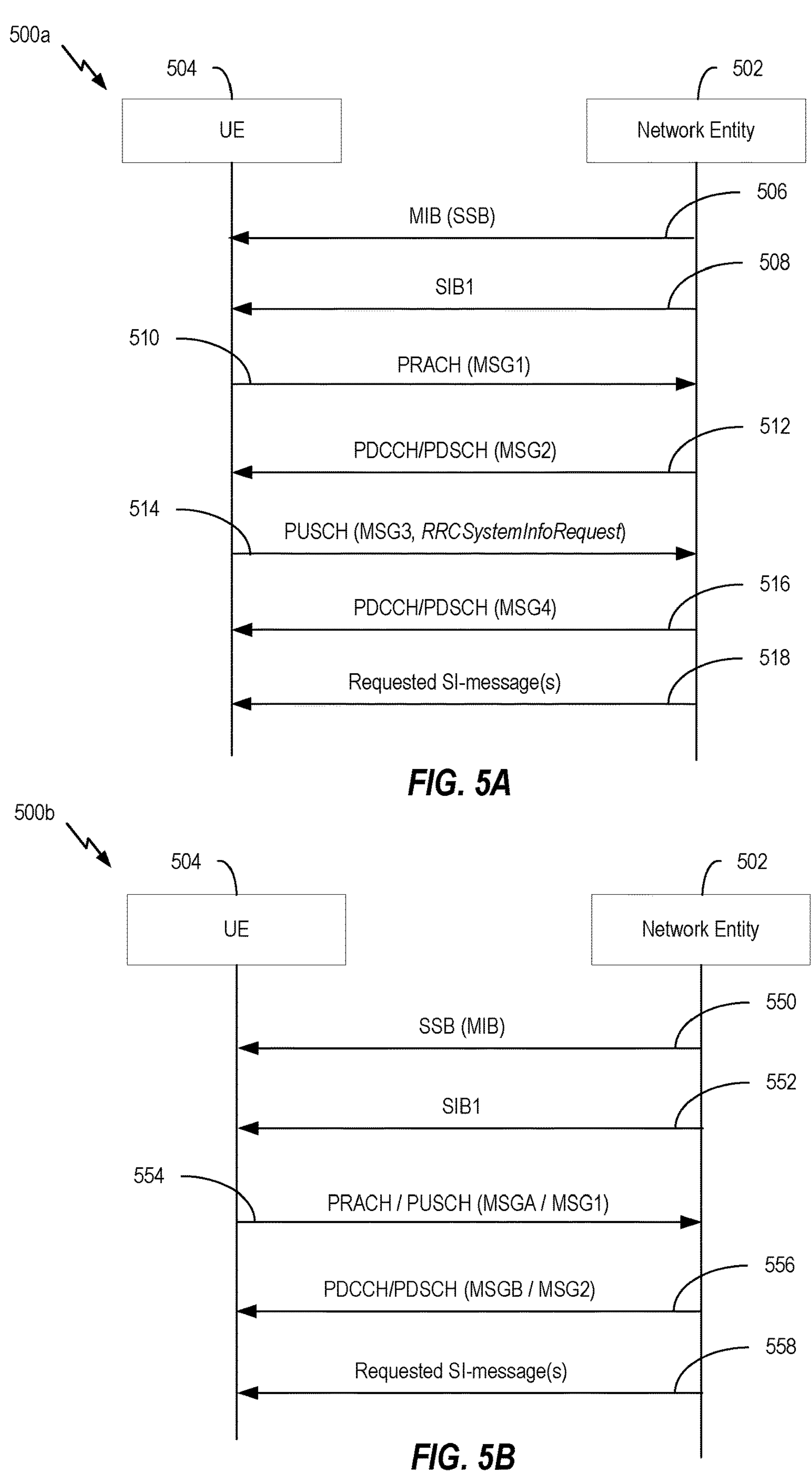
FIG. 5A is an example process flow diagram depicting an example random access procedure performed between a UE and a network entity to establish a radio resource control connection.
FIG. 5B is an example process flow diagram depicting another example random access procedure performed between a UE and a network entity to establish a radio resource control connection.

FIG. 5A depicts a process flow diagram of an example RACH procedure 500*a* (referred to as a "four-step RACH procedure") performed between a UE 504 and a network entity 502. In some aspects, the UE 504 is the UE 104 depicted and described with respect to FIGS. 1 and 3, and the network entity 502 is the base station 102 depicted and described with respect to FIGS. 1 and 3 or a disaggregated base station depicted and described with respect to FIG. 2.

The RACH procedure 500*a* may begin, at 506, with the network entity 502 broadcasting and the UE 504 receiving an MIB. The MIB is carried by the PBCH, which, as described above, may be logically grouped with a PSS and a SSS to form a SS/PBCH block, and in some cases, referred to as an SSB. The MIB is the first, among other SIBs, which may also be broadcasted by network entity 502. The MIB is a control channel message transmitted by network entity 502 that provides necessary information to UE 504 to synchronize with the network and access a cell of network entity 502. Network entity 502 may transmit MIBs periodically.

The RACH procedure 500*a* then proceeds, at 508, with the network entity 502 broadcasting and the UE 504 receiving a SIB1. The SIB1 may carry basic information that UE 504 may use to perform initial attachment to the RAN and network entity 502.

At 510, the UE 504 sends a first message (MSG1) to the network entity 502 on a physical random access channel (PRACH). In some aspects, MSG1 may indicate or include a RACH preamble. The RACH preamble may indicate or include a preamble signature associated with the RACH preamble. The preamble signature may correspond to a particular preamble sequence (e.g., a Zaddoff Chu sequence) generated across time-frequency resources used for the preamble transmission. For contention-based random access (CBRA), the preamble sequence may be randomly selected among a set of preamble sequences (e.g., up to 64 sequences in some cases). The preamble signature may be used to identify the UE 504 for scheduling communications (e.g., MSG2 and MSG3) with the network entity 502. The term "RACH preamble" may refer to or correspond to "random access preamble," "preamble," "preamble sequence," and/or "preamble signature."

At 512, the network entity 502 responds with a random access response (RAR) message (MSG2). For example, the network entity 502 may send a PDCCH communication including DCI that schedules the RAR on the PDSCH. The RAR may include, for example, certain parameters used for an uplink transmission such as a random access (RA) preamble identifier (RAPID), a timing advance, an uplink (UL) grant (e.g., indicating one or more time-frequency resources for an uplink transmission), cell radio network temporary identifier (C-RNTI), and/or a backoff parameter value. The RAPID may correspond to the preamble signature and indicate that the RAR is for the UE 504 that transmitted MSG1 at 510. As an example, the RAPID may identify a particular frequency resource used for the preamble transmission. The backoff parameter value may be used to determine a RACH occasion (RO) for sending a subsequent RACH transmission (e.g., a preamble transmission). An RO may correspond to one or more time-frequency resources available for transmitting a preamble on a RACH.

At 514, in response to MSG2, the UE 504 transmits a third message (MSG3) to the network entity 502 on the PUSCH. In some aspects, MSG3 may include an RRC connection request, a tracking area update (e.g., for UE mobility), and/or a scheduling request (e.g., for an UL transmission). As an example, MSG3 may use the time-frequency resource(s) indicated in the UL grant of the RAR. In some examples, MSG3 may include a bitmap of one or more requested SI messages.

At 516, the network entity 502 sends a contention resolution message (MSG4) in response to MSG3. In some cases, if the UE 504 is unable to receive or decode MSG3 and/or MSG4, the UE 504 may repeat RACH procedure 500*a*.

After receiving MSG4 at 516, UE 504 monitors for other system information (OSI) (e.g., SIBs other than SIB1). Based on the monitoring, UE 504 may receive, at 518, SI message(s) (e.g., requested SI message(s)).

In some cases, to reduce the latency associated with random access, another RACH procedure may be used, such as a two-step RACH procedure instead of a four-step RACH procedure (e.g., RACH procedure 500*a*). As the name implies, the two-step RACH procedure may effectively consolidate the four messages of the four-step RACH procedure into two messages.

FIG. 5B depicts a process flow diagram of another example RACH procedure 500*b* (referred to as a "two-step RACH procedure") performed between the UE 504 and the network entity 502. The RACH procedure 500*b* may optionally begin at 550, where the network entity 502 broadcasts and the UE 504 receives a MIB, for example within an SSB. Further, at 552, the network entity 502 broadcasts and the UE 504 receives a SIB1 (e.g., steps 550 and 552 in the RACH procedure 500*b* may be similar to steps 506 and 508 in the RACH procedure 500*a*). The SIB1 may include random access resources in SI-RequestConfig, where the RA resources are linked to requested SI messages.

At 554, the UE 504 sends a first message (MSG1 or MSGA) to the network entity 502, which may effectively combine MSG1 and MSG3 described above with respect to FIG. 5A. In some aspects, MSG1/MSGA includes a RACH preamble for random access and a payload. For example, the payload may include a UE-ID and other signaling information, such as a buffer status report and/or a scheduling request. The RACH preamble of MSG1/MSGA may be transmitted over the RACH, and the payload of MSGA may be transmitted over the PUSCH, for example.

At 556, the network entity 502 sends a random access response message (MSG2 or MSGB), which may effectively combine MSG2 and MSG4 described above with respect to FIG. 5A. For example, MSGB may include a RAPID.

After receiving MSG2/MSGB, UE 504 monitors for OSI. Based on the monitoring, UE 504 may receive, at 558, SI message(s) (e.g., requested SI message(s)).

RACH procedure 500*a* and/or 500*b* may be performed in an anchor cell of network entity 502. For example, an anchor carrier, associated with the anchor cell of network entity 502, may support cell-defining broadcast transmissions including synchronization and system information signaling, which configures a RAN. As such, the anchor carrier may carry all channels (e.g., including broadcast channels) as well as SSB transmission(s) at steps 506, 550 and SIB1 transmission(s) at steps 508, 552 in FIGS. 5A and 5B, respectively. For example, SSB transmission and SIB1 transmission (and, in some cases, paging) may be continuously supported in the anchor cell corresponding to the anchor carrier (e.g., referred to herein as "always on" SSB and SIB1).

In order to increase the overall capacity for random access (and in some cases paging) and reduce latency to establish a connection between a UE and a network entity, in certain aspects, support for random access procedures may be extended to using a non-anchor carrier also associated with network entity 502, where network entity 502 supports a multi-carrier operation. Aspects related to multi-carrier operation and the performance of random access procedures in non-anchor cells are described in detail below.

Example Multi-Carrier Operation

In some cases, a network entity (e.g., such as BS 102 of FIGS. 1 and 3, or a disaggregated base station as discussed with respect to FIG. 2) may support a multi-carrier operation. For example, a network entity may support two types of carriers: an anchor carrier and a non-anchor carrier. As described herein, an anchor carrier may support synchronization and system information signaling (e.g., SSB and SIB transmission(s)). A non-anchor carrier may be activated for improving the system access and/or data transmission capacity beyond that offered by the anchor carrier.

Figure 6A:
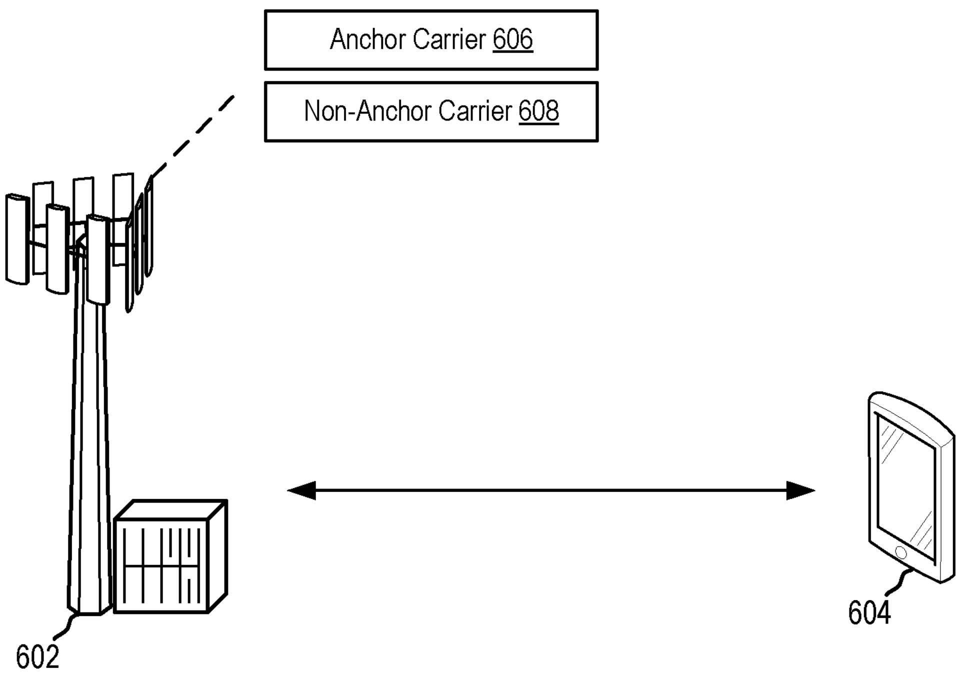
FIG. 6A depicts an example wireless communications network that supports multi-carrier operation.

FIG. 6A depicts an example wireless communications network 600 (e.g., an example of wireless communications network 100 depicted and described with respect to FIG. 1) that supports multi-carrier operation. As shown, wireless communications network 600 may include a network entity 602, such as a BS (e.g., an example of BS 102 depicted and described with respect to FIGS. 1 and 3 or a disaggregated base station depicted and described with respect to FIG. 2), and a UE 604 (e.g., an example of UE 104 depicted and described with respect to FIGS. 1 and 3).

Network entity 602 may be configured to communicate using multiple different carriers (e.g., specific carrier frequencies). For example, network entity 602 is shown as being configured to communicate using an anchor carrier 606 and a non-anchor carrier 608. Accordingly, network entity 602 may provide coverage using each of anchor carrier 606 and non-anchor carrier 608 in their corresponding cell(s).

Figure 6B:
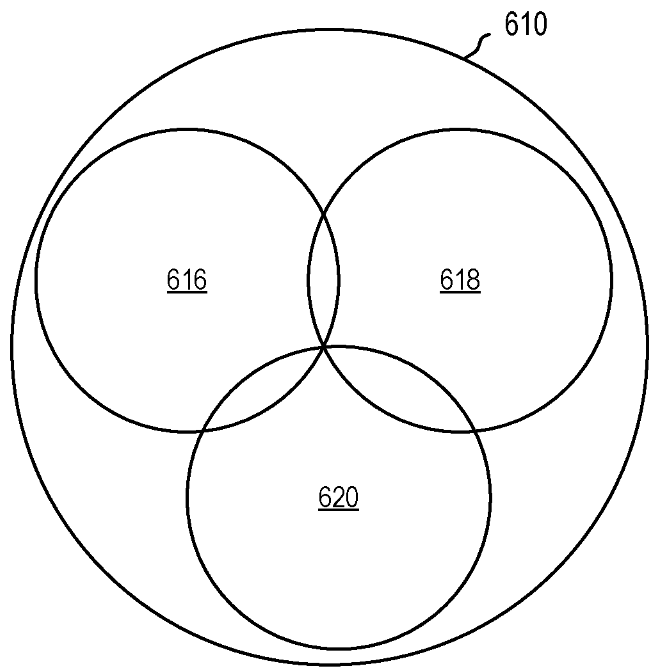
FIG. 6B depicts example anchor and non-anchor cells in a multi-carrier operation.

For example, as shown in FIG. 6B, network entity 602 may provide coverage in an anchor cell 610 using anchor carrier 606. Further, network entity 602 may provide coverage in non-anchor cells 616, 618, and 620 using non-anchor carrier 608. Specifically, non-anchor cells 616, 618, and 620 may serve different geographical areas but may operate on the same carrier frequency. Non-anchor cells 616, 618, and 620 may be created via different transmission reception points (TRPs) located in different sites or different sectors of a same cell site. As shown, non-anchor cells 616, 618, and 620 overlap with anchor cell 610, and anchor cell 610 encompasses all of non-anchor cells 616, 618, and 620. Further, as shown, cells 610, 616, 618, and 620 are not concentric. It should be noted, however, that this is just one example arrangement of an anchor cell and non-anchor cells. In other cases, one or more of the anchor cells and/or non-anchor cells may be concentric, may have the same coverage area, may overlap differently, may not overlap, and/or the like.

In certain aspects, anchor carrier 606 (e.g., in FIG. 6A associated with anchor cell 610 in FIG. 6B) may carry all channels (e.g., including broadcast channels) as well as SSBs and SIBs. For example, SSB transmission, SIB1 transmission, and/or paging may be continuously (e.g., "Always On" SSB and SIB1) supported in anchor cell 610.

In certain aspects, unlike in anchor cell 610, the common signaling, synchronization signaling, and/or the system information signaling may not be communicated in non-anchor cells 616, 618, 620. As such, a non-anchor cell may be a cell where UE 604 may not receive this signaling, and thus, random access procedures (depicted and described with respect to FIGS. 5A-5B) for establishing an RRC connection may only be supported in anchor cell 610 associated with anchor carrier 606.

Accordingly, in this case, UE 604 may be configured to establish an RRC connection in anchor cell 610 (instead of in one of non-anchor cells 616, 618, 620), for example, by initiating a random access procedure in anchor cell 610. In some cases, after establishing an RRC connection in anchor cell 610, UE 604 may be handed over to one of non-anchor cells 616, 618, 620.

For example, in certain aspects, UE 604 (e.g., capable of supporting non-anchor cell operation) may be handed over to one of non-anchor cells 616, 618, 620 (e.g., from anchor cell 610) to help offload traffic between network entity 602 and UE 604 from anchor cell 610 to one of non-anchor cells 616, 618, 620 of network entity 602. For example, UE 604 may be handed over to utilize one of non-anchor cell 616, 618, 620 for unicast traffic, which may help to reduce the use of anchor cell 610 for carrying such traffic.

As another example, in certain aspects, UE 604 (e.g., capable of supporting non-anchor cell operation) may be handed over to one of non-anchor cells 616, 618, 620 (e.g., from anchor cell 610) when bandwidth of anchor cell 610, associated with anchor carrier 606, is smaller than bandwidth of at least one of non-anchor cells 616, 618, 620, associated with non-anchor carrier 608. As used herein, bandwidth may refer to the data transfer capacity of a network in bits per second. For example, anchor cell 610 may be a frequency division duplex (FDD) cell with 10 megahertz (MHz) of bandwidth, while non-anchor cell 616 may be a time division duplex (TDD) cell with 100 MHz bandwidth. In order to improve data transmission, UE 604 may be handed over from anchor cell 610 to non-anchor cell 616 to utilize the 100 MHz bandwidth.

As another example, in certain aspects, UE 604 (e.g., capable of supporting non-anchor cell operation) may be handed over to one of non-anchor cells 616, 618, 620 (e.g., from anchor cell 610) when signal quality provided by at least one of non-anchor cells 616, 618, 620, associated with non-anchor carrier 608, is better than the signal quality provided in anchor cell 610.

In either of these cases, UE 604 may be handed over from anchor cell 610 to one of non-anchor cells 616, 618, 620. Delay in accessing the network, as well as receiving one or more data transmissions, may result due to this handover procedure.

In order to reduce the delay at UE 604 and/or increase the overall capacity for random access (and in some cases paging), in certain aspects, support for random access procedures may be enabled in non-anchor cells(s) 616, 618, 620 for communications between network entity 602 and UE 604 (e.g., while also maintaining support for RACH procedures between UE 604 and network entity 602 in anchor cell 610). For example, non-anchor carrier 608 may support the transmission of SSB(s) and/or SIB(s), such as SIB1 (e.g., that carries basic information that UE 604 may use to perform the initial attachment) in non-anchor cells 616, 618, 620, such that UE 604 is able to perform a random access procedure in non-anchor cells 616, 618, 620.

Figure 7:
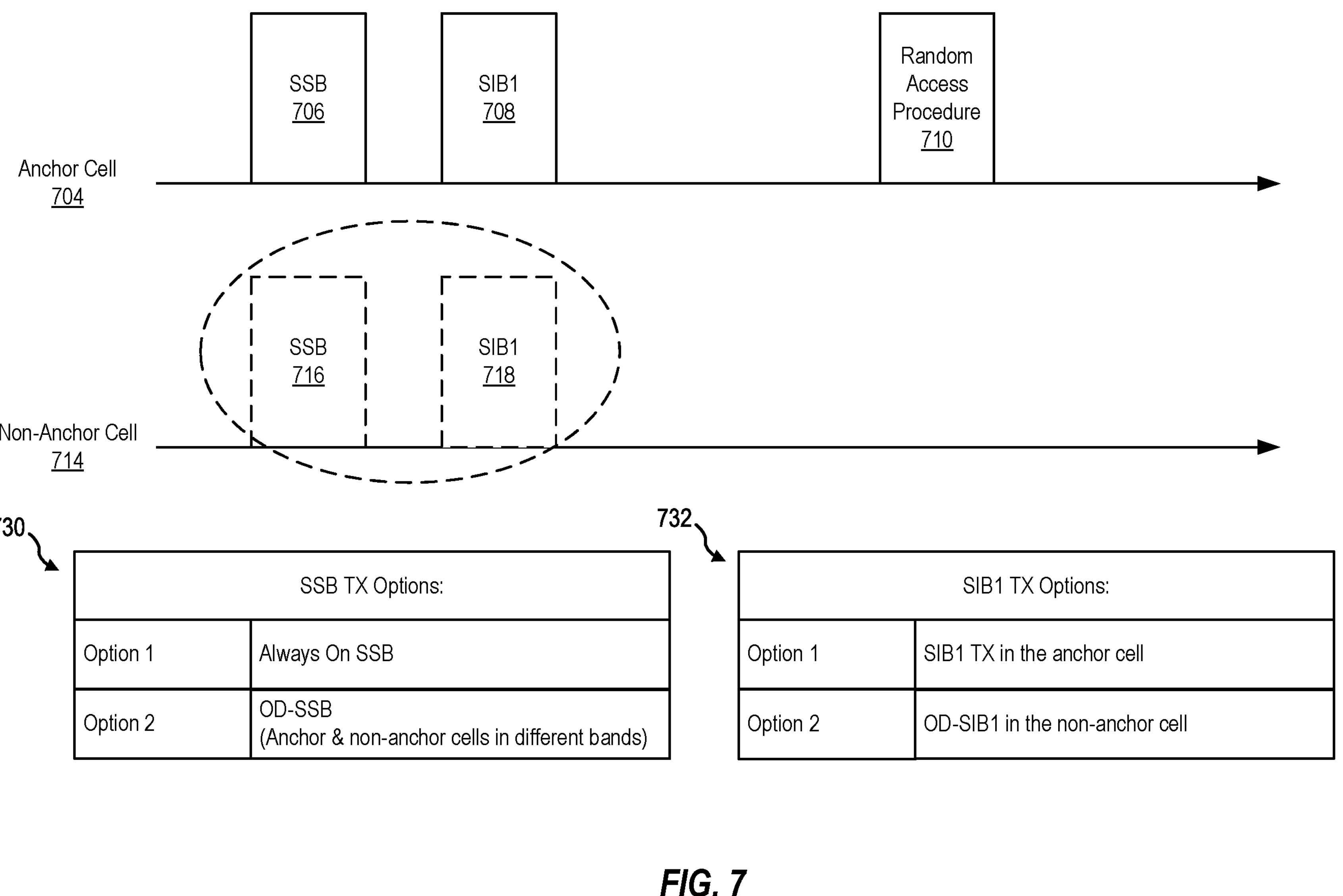
FIG. 7 depicts example configurations that may be supported in anchor and non-anchor cells in a multi-carrier implementation.

Different configurations for SSB and SIB1 transmissions, depicted in FIG. 7, may be considered for such multi-carrier implementations. As shown in FIG. 7, the transmission of SSB 706 and SIB1 708, and thus the reception of SSB 706 and SIB1 708 by a UE, may be supported in an anchor cell 704. As described in detail below, a random access procedure used by a UE for initial access to a RAN, may begin by a network entity broadcasting and the UE receiving an SSB and an SIB1. As such, by supporting the transmission of SSB 706 and SIB1 708 in anchor cell 704, a UE may be configured to perform a RACH procedure 710 with the network entity in anchor cell 704. The UE may perform RACH 710 to establish an RRC connection with the RAN.

In certain aspects, a UE may additionally, or alternatively, perform a random access procedure with the network entity in a non-anchor cell 714. As such, different configurations for SSB 716 and SIB1 718 transmissions in non-anchor cell 714 may be considered.

For example, as shown in table 730 in FIG. 7, in a first option, the network entity may support "Always On SSB" in the non-anchor cell 714 indicating that the network entity may support the transmission of SSB 716 in non-anchor cell 714 at any time. For example, the network entity may transmit SSB(s) 716 in non-anchor cell 714, such as on a periodic broadcast basis, to allow a UE to perform a random access procedure in non-anchor cell 714.

In a second option, the network entity may support "On-demand SSB" in the non-anchor cell 714 indicating that the network entity may provide SSB(s) on demand in non-anchor cell 714. For example, the network entity may transmit SSB(s) 716 in non-anchor cell 714 based on receiving an instruction and/or a request, etc., such that a UE may perform a random access procedure with the network entity in non-anchor cell 714.

Further, different SIB1 configurations are provided in table 732. In a first option, the network entity may support the transmission of SIB1 only in anchor cell 704. Thus, transmission of SIB1 in non-anchor cell 714 may not be supported.

In a second option, however, the network entity may support "OD-SIB1" in non-anchor cell 714, indicating that the network entity may provide SIB1(s) on demand in non-anchor cell 714. For example, the network entity may transmit SIB1(s) in non-anchor cell 714 based on receiving an instruction and/or a request (e.g., from a UE), etc. Transmission of OD-SIB1(s) in non-anchor cell 714 may enable the UE to perform a random access procedure with the network entity in non-anchor cell 714.

Providing support for RACH in non-anchor cells, in addition to anchor cells, may allow for quicker connection to a network entity by a UE, may help with load balancing at a network entity, may help to increase network energy savings, and/or may help to improve data transmission between a UE and a network entity. For example, offloading a random access procedure to a non-anchor cell may help to alleviate the number of random access procedures being performed in the anchor cell, especially in cases where a large number of devices are supported at the network entity. Accordingly, instead of waiting a long period of time to successfully complete a random access procedure in an anchor cell, a UE may perform a random access procedure in a non-anchor cell, which may allow for quicker establishment of an RRC connection between the UE and the RAN. Further, because non-anchor cells may support "On-demand SSB/SIB1," instead of "Always On SSB/SIB1," energy may be saved when the network entity is not performing such transmissions. Performance of the random access procedure in the non-anchor cell may also reduce any delay caused as a result of needing to handover the UE from an anchor cell to a non-anchor cell in cases where the UE performs the random access procedure in the anchor cell.

Example OD-SIB1 Procedures in Non-Anchor Cells

Figures 8A, 8B:
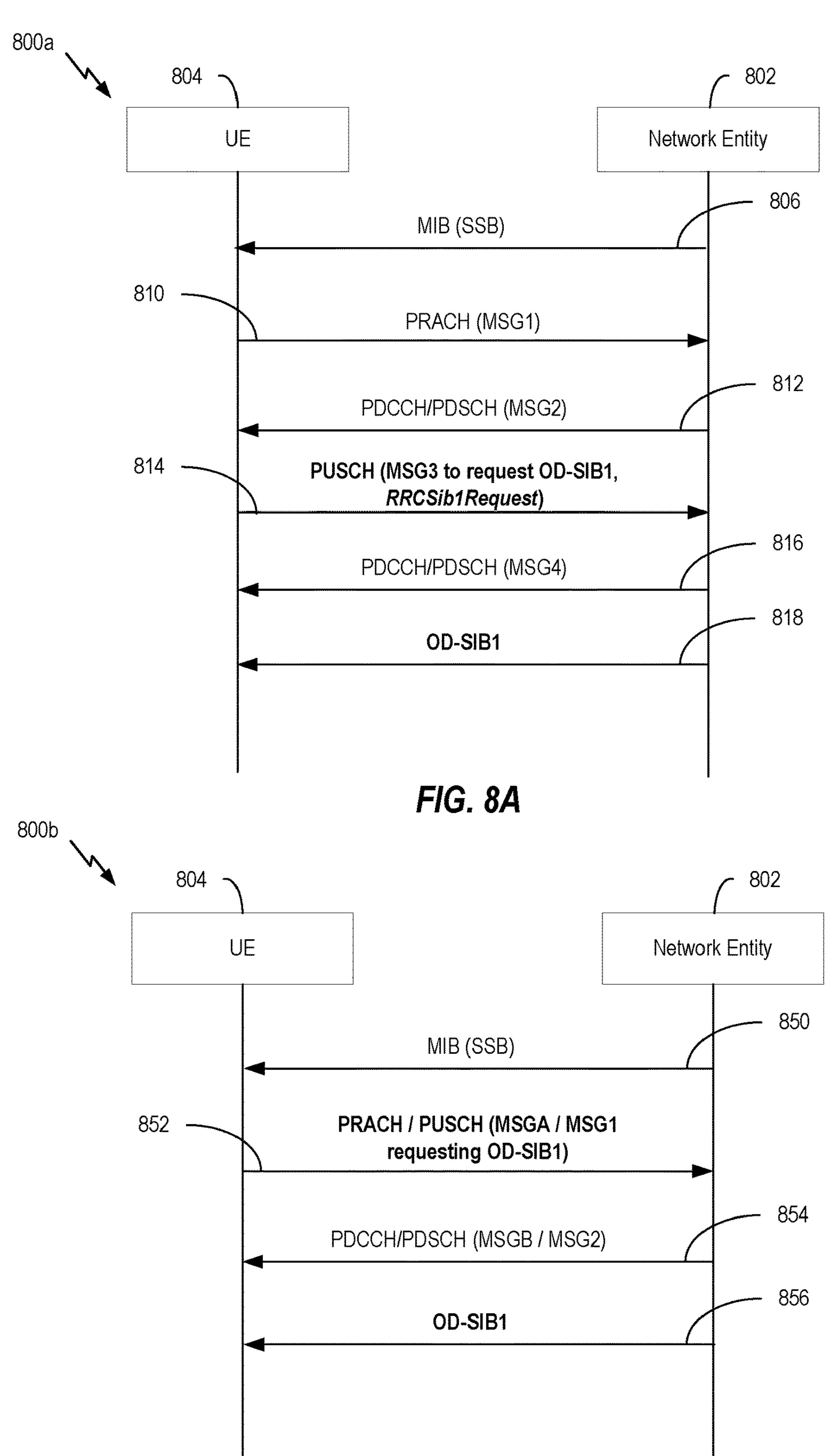
FIG. 8A is an example process flow diagram depicting an example on-demand system information block procedure performed between a UE and a network entity in a non-anchor cell supporting on-demand system information block 1 transmission.
FIG. 8B is an example process flow diagram depicting another example on-demand system information block procedure performed between a UE and a network entity in a non-anchor cell supporting on-demand system information block 1 transmission.

FIGS. 8A and 8B are example process flow diagrams depicting example OD-SIB1 procedures 800*a*, 800*b*, respectively, performed between a UE 804 and a network entity 802 in a non-anchor cell supporting OD-SIB1 transmission. In some aspects, UE 804 is the UE 104 depicted and described with respect to FIGS. 1 and 3, and network entity 802 is the base station 102 depicted and described with respect to FIGS. 1 and 3 or a disaggregated base station depicted and described with respect to FIG. 2.

Specifically, FIG. 8A depicts an OD-SIB1 procedure 800*a* performed between UE 804 and network entity 802 during a random access procedure, such as RACH procedure 500*a* described and depicted with respect to FIG. 5A (e.g., a four-step RACH procedure). For example, the OD-SIB1 procedure depicted in FIG. 8A is based on a contention based RACH procedure (CBRA) given dedicated ROs are not configured for UE 804 sending, to network entity 802, a request to send an OD-SIB1.

As shown in FIG. 8A, OD-SIB1 procedure 800*a* begins, at 806, with network entity 802 broadcasting and UE 804 receiving an MIB (e.g., similar to step 506 in FIG. 5A). The MIB may be carried by the PBCH, which, as described above, may be logically grouped with a PSS and a SSS to form an SSB.

Further, similar to steps 510 and 512 in FIG. 5A, at 810, UE 804 sends a first message (MSG1) (e.g., which may indicate or include a RACH preamble) to network entity 802 on a PRACH and, at 812, network entity 802 responds with an RAR message (MSG2).

At 814, in response to MSG2, UE 804 transmits a third message (MSG3) to the network entity 502 on the PUSCH. In some aspects, MSG3 may include a request to send an OD-SIB1 (e.g., via field RRCSib1Request).

At 816, network entity 802 may send a contention resolution message (MSG4) in response to MSG3. Further, in response to MSG3 including the request to send the OD-SIB1, network entity 802 may send an OD-SIB1 to UE 804 at 818.

FIG. 8B depicts an OD-SIB1 procedure 800*b* performed between UE 804 and network entity 802 during a random access procedure, such as RACH procedure 500*b* described and depicted with respect to FIG. 5B (e.g., a two-step RACH procedure). For example, the OD-SIB1 procedure depicted in FIG. 8B is based contention free RACH procedure (CFRA) given dedicated ROs are configured for UE 804 sending, to network entity 802, a request to send an OD-SIB1.

As shown in FIG. 8B, OD-SIB1 procedure 800*b* may begin, at 806, with network entity 802 broadcasting and UE 804 receiving an MIB (e.g., similar to step 550 in FIG. 5B). The MIB may be carried by the PBCH, which, as described above, may be logically grouped with a PSS and a SSS to form an SSB. The SSB may be a CD SSB or an NCD SSB.

Further, similar to step 554 in FIG. 5B, at 852, UE 804 sends a first message (MSG1 or MSGA) to the network entity 802, which may effectively combine MSG1 and MSG3 described above with respect to FIG. 8A. In FIG. 8B, in some aspects, MSG1/MSGA may include a request to send an OD-SIB1.

At 854, the network entity 802 may send a random access response message (MSG2 or MSGB) in response to MSG1/MSGA, which may effectively combine MSG2 and MSG4 described above with respect to FIG. 8A. For example, MSG2/MSGB may include a RAPID. Further, in response to MSG1/MSGA including the request to send the OD-SIB1, network entity 802 may send an OD-SIB1 to UE 804 at 856.

In certain aspects, UE 804 may be provided with a configuration to perform OD-SIB1 procedure 800*a* in FIG. 8A and/or OD-SIB1 procedure 800*b* in FIG. 8B. For example, in cases where a non-anchor cell supporting OD- SIB1 transmission is overlaid on an anchor cell associated with network entity 802 (e.g., as shown in FIG. 6B), UE 804 may be provided, in the anchor cell, with an OD-SIB1 cell configuration for the non-anchor cell. The OD-SIB1 cell configuration may include (1) a first configuration for sending one or more OD-SIB1 requests (e.g., as uplink WUSs) to network entity 802 in the non-anchor cell (e.g., an uplink WUS configuration) and (2) a second configuration for receiving one or more OD-SIB1s from network entity 802 in the non-anchor cell. In certain aspects, the OD-SIB1 cell configuration may further include a third configuration for sending HARQ ACK/NACK feedback in response to the one or more OD-SIB1s from network entity 802. Based on the first configuration, UE 804 may send, in the non-anchor cell, an OD-SIB1 request (e.g., shown at 814 in FIGS. 8A and 852 in FIG. 8B). Further, based on the second configuration, UE 804 may receive, in the non-anchor cell, the requested OD-SIB1 (e.g., shown at 818 in FIGS. 8A and 856 in FIG. 8B).

As described, the OD-SIB1 cell configuration may be a cell-specific configuration. Thus, in cases where multiple non-anchor cells are overlaid on an anchor cell, the anchor carrier associated with the anchor cell may need to provide the UE with an OD-SIB1 cell configuration per non-anchor cell. For example, where the anchor cell is an FDD cell and each non-anchor cell is a TDD cell, multiple non-anchor cells may be overlaid on the anchor cell (e.g., multiple non-anchor cells may be within the coverage area of the anchor cell). Assuming UE 804 is located within a coverage area of the anchor cell and a first non-anchor cell that supports OD-SIB1 transmission, network entity 802 may send to UE 804 in the anchor cell, a first OD-SIB1 cell configuration for the first non-anchor cell. If UE 804 is later relocated to be within a second coverage area of the anchor cell and a second non-anchor cell that supports OD-SIB1 transmission, network entity 802 may send to UE 804 in the anchor cell, a second OD-SIB1 cell configuration for the second non-anchor cell. As such, network entity 802 may provide UE 804 with a new OD-SIB1 cell configuration each time UE 804 is relocated from within a coverage area of a first non-anchor cell to within a coverage area of a second non-anchor cell. Providing UE 804 with an OD-SIB1 cell configuration for each non-anchor cell (e.g., that supports OD-SIB1 transmission) separately may result in increased signaling overhead and/or power consumption at UE 804 and network entity 802, e.g., technical problems associated with supporting OD-SIB1 procedures in non-anchor cells.

Another technical problem associated with supporting OD-SIB1 procedures in non-anchor cells involves legacy UEs attempting to perform a random access procedure in a non-anchor cell of a network entity (e.g., to establish an RRC connections with the network entity). For example, a legacy UE may detect and receive an SSB in a non-anchor cell supporting OD-SIB1 transmission, when the legacy UE is geographically located within the non-anchor cell. The UE may decode the SSB and wait for a subsequent SIB1 transmission in the non-anchor cell. However, as discussed above, SIB1 transmission within the non-anchor cell may be dynamically triggered, such as based on the network entity receiving an instruction and/or a request for the SIB1. As such, without this dynamic trigger, the network entity may not send any SIB1 transmission, and thus, the legacy UE may not receive and decode any SIB1 to begin a random access procedure in the non-anchor cell. As such, the legacy UE may be considered to be "camping" on the non-anchor cell, which presents a technical problem for the legacy UE given the legacy UE may not be able to establish an RRC connection in the non-anchor cell and thus may waste power in attempting to receive and decode an SIB1 in the non-anchor cell when SIB1 is not transmitted by the non-anchor cell (e.g., without first receiving a request for the SIB1).

Aspects Related to an OD-SIB1 Configuration Associated with Multiple Non-Anchor Cells Aspects described herein relate to OD-SIB1 configurations common to a plurality of non-anchor cells supporting OD-SIB1 transmission. For example, a UE supporting OD-SIB1 procedures in non-anchor cells and within a coverage area of a non-anchor cell overlaid on an anchor cell of a network entity, may receive a configuration for performing an OD-SIB1 procedure. The UE may receive the configuration in the anchor cell of the network entity. The configuration may be common to a plurality of non-anchor cells supporting OD-SIB1 transmission and on a same frequency layer.

In certain aspects, the OD-SIB1 configuration is associated with a plurality of non-anchor cells having overlapping coverage with one anchor cell, such as shown in FIG. 6B. For example, a network entity may provide coverage in an anchor cell using an anchor carrier. Further, the network entity may provide coverage in a number, N, of non-anchor cells (e.g., where N is an integer greater than one) using a non-anchor carrier. The N non-anchor cells may overlap the anchor cell, and the anchor cell may encompass all of the non-anchor cells (e.g., similar to the overlapping of non-anchor cells and the anchor cell in FIG. 6B). A UE may receive, in the anchor cell, a configuration for performing an OD-SIB1 procedure (e.g., an "OD-SIB1 configuration"). The configuration may be associated with each of the N non-anchor cells, such that the UE may use the OD-SIB1 configuration to request and receive OD-SIB1(s) in the N non-anchor cells associated with the OD-SIB1 configuration. However, the UE may request and receive OD-SIB1(s) in one or more of the N non-anchor cells. In this way, when the UE is relocated from within a coverage area of a first non-anchor cell to a second non-anchor cell (e.g., associated with the N non-anchor cells), the UE may continue to use the same OD-SIB1 configuration. For example, a new OD-SIB1 configuration may be sent to the UE only when the UE relocates from within a coverage area of the anchor cell to a coverage area of another anchor cell.

In certain aspects, the OD-SIB1 configuration is associated with a plurality of non-anchor cells having overlapping coverage with a group of anchor cells (e.g., a plurality of anchor cells explicitly or implicitly belonging to the group). The group of anchor cells may include two or more anchor cells. For example, a network entity may provide coverage (1) in a first anchor cell and (2) in a second anchor cell (e.g., one or more anchor cells may be associated with a same network entity). The first anchor cell and the second anchor cell may belong to a first group. Further, the network entity may provide coverage in a number, M, of non-anchor cells (e.g., where M is an integer greater than one) using a non-anchor carrier. A first subset of the M non-anchor cells may overlap the first anchor cell, and the first anchor cell may encompass all of the first subset of M non-anchor cells (e.g., similar to the overlapping of non-anchor cells and the anchor cell in FIG. 6B). A second subset of the M non-anchor cells (e.g., the remaining non-anchor cells) may overlap the second anchor cell, and the second anchor cell may encompass all of the second subset of M non-anchor cells. A UE may receive, in the first anchor cell or the second anchor cell, a configuration for performing an OD-SIB1 procedure. The configuration may be associated with the first group of anchor cells, including the first anchor cell and the second anchor cell, and more specifically, each of the M non-anchor cells having overlapping coverage with the first and second anchor cells. Accordingly, the UE may use the OD-SIB1 configuration to, at least, request and receive OD-SIB1(s) in one or more of the M non-anchor cells. In this way, when the UE is relocated from within a coverage area of a first non-anchor cell to a second non-anchor cell (e.g., associated with the M non-anchor cells), the UE may continue to use the same OD-SIB1 configuration for performing an OD-SIB1 procedure. Further, when the UE is relocated from within a coverage area of the first anchor cell to within a coverage area of the second anchor cell, the UE may continue to use the same OD-SIB1 configuration for performing an OD-SIB1 procedure. However, a new OD-SIB1 configuration may be sent to the UE when the UE relocates to a coverage area not associated with the first anchor cell, the second anchor cell, and/or any of the M non-anchor cells.

Although the above example describes an OD-SIB1 configuration common to a plurality of non-anchor cells having coverage areas overlapping the coverage areas associated with a group of two anchor cells, in some other examples, the OD-SIB1 configuration may be common to a plurality of non-anchor cells overlapping the coverage areas associated with a group of three or more anchor cells. Further, although the above example describes two anchor cells belonging to a same network entity, in some other examples, the OD-SIB1 configuration may be common to a plurality of non-anchor cells having coverage areas overlapping coverage areas associated with a group of anchor cells belonging to two or more network entities.

In certain aspects, the OD-SIB1 configuration described herein may include (1) a first configuration for OD-SIB1 request transmission (e.g., as uplink WUSs) to the network entity in one or more non-anchor cells associated with the OD-SIB1 configuration and (2) a second configuration for OD-SIB1 reception from the network entity in one or more of the non-anchor cells associated with the OD-SIB1 configuration. In certain aspects, the OD-SIB1 configuration may further include a third configuration for SSB reception in one or more non-anchor cells associated with the OD-SIB1 configuration. In certain aspects, the OD-SIB1 configuration may further include a fourth configuration for sending HARQ ACK/NACK feedback in response to the one or more OD-SIB1s received from the network entity in one or more of the non-anchor cells associated with the OD-SIB1 configuration. Details regarding each of these configurations included in the OD-SIB1 configuration (e.g., common to multiple non-anchor cells) are provided below.

Utilizing an OD-SIB1 configuration, common to plurality of non-anchor cells, beneficially reduces signaling overhead, while supporting OD-SIB1 procedures in non-anchor cells. For example, transmission of an OD-SIB1 configuration may not be needed each time a UE is relocated to another non-anchor cell and/or another anchor cell, given the OD-SIB1 configuration is not designed to be cell-specific. Minimizing signaling overhead related to OD-SIB1 procedures may help to reduce power consumption at the network entity and/or UE, as well as reduce resources used for such transmission to improve overall communication performance.

In certain aspects, an MIB broadcast in a non-anchor cell overlaid on an anchor cell may include a field, cellBarred, set to "barred" to prevent legacy UEs (e.g., UEs that do not support connection to non-anchor cells where OD-SIB1 transmission occurs) from "camping" on the non-anchor cell. For example, a legacy UE may determine to establish an RRC connection with a network entity. The network entity may broadcast in a non-anchor cell associated with the network entity an SSB including an MIB, and the legacy UE may detect and decode the MIB. To avoid the legacy UE from attempting to establish a connection with the network entity in the non-anchor cell, the MIB may include a cellBarred field set to "barred." Based on the cellBarred field being set to "barred," the legacy UE may refrain from establishing the RRC connection with the network entity in the non-anchor cell. Instead, the legacy UE may attempt to establish an RRC connection within the anchor cell, given SSBs and SIB1s are continuously transmitted within the anchor cell (e.g., as described above with respect to FIG. 7). As such, utilizing the cellBarred field of an MIB may beneficially help to prevent legacy UEs from "camping" on the non-anchor cell such that the legacy UEs may be re-directed to establish a connection in an anchor cell instead. Redirecting these legacy UEs to establish a connection in an anchor cell may prevent the legacy UE from wasting energy trying to receive and decode a SIB1 in the non-anchor cell, which may never come (e.g., as described, SIB1 transmission in the non-anchor cell may be dynamic and without receiving a request for the SIB1 then the SIB1 may not be sent in the non-anchor cell).

Example Operations of Entities in a Communications Network

Figure 9:
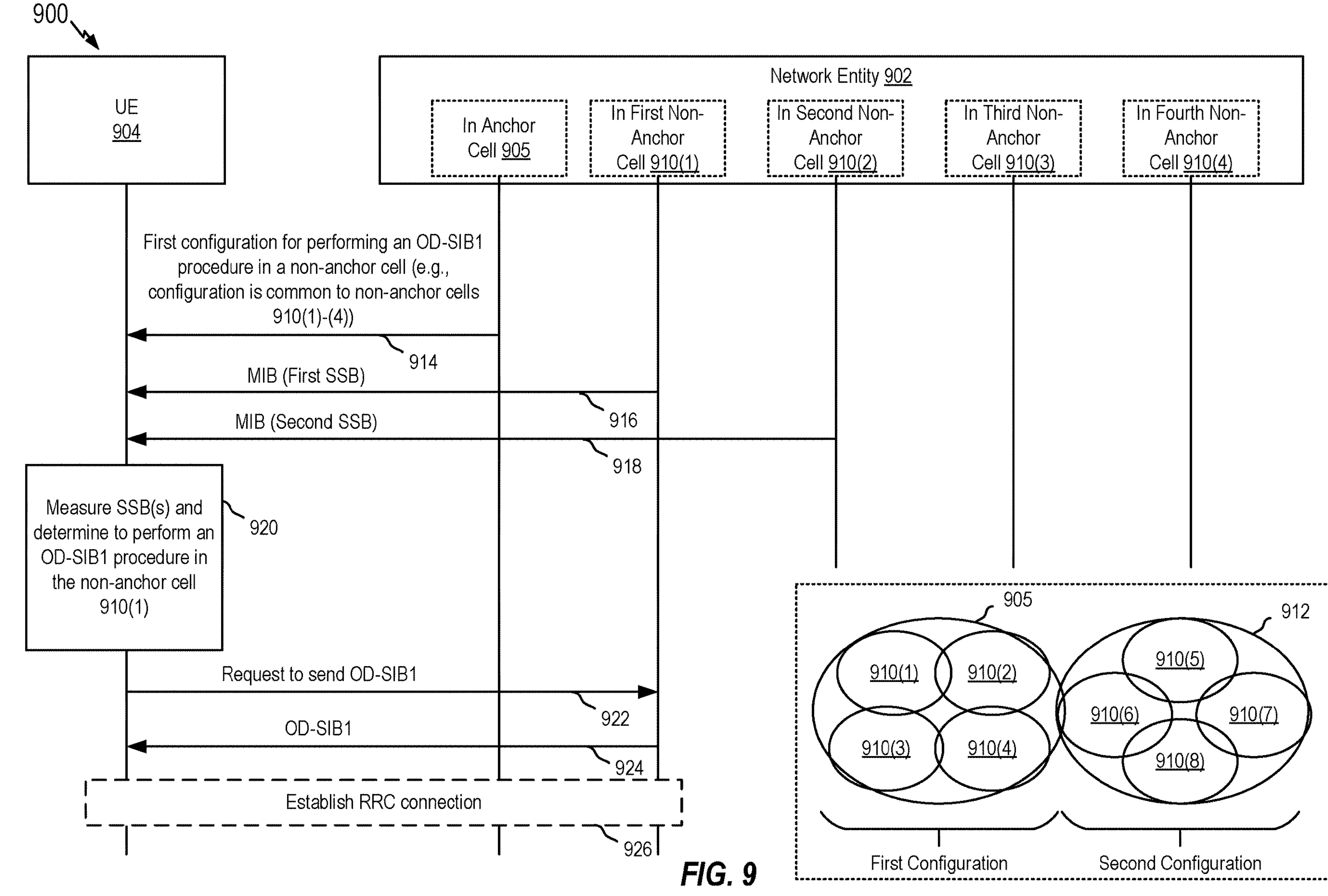
FIG. 9 depicts a process flow for communications in a network between a network entity and a UE for performing an on-demand system information block 1 procedure.

FIG. 9 depicts a process flow 900 for communications in a network between a network entity 902 and a UE 904 for performing an OD-SIB1 procedure. In some aspects, the network entity 902 may be an example of the BS 102 depicted and described with respect to FIGS. 1 and 3 or a disaggregated base station depicted and described with respect to FIG. 2. Similarly, the UE 904 may be an example of UE 104 depicted and described with respect to FIGS. 1 and 3. However, in other aspects, UE 904 may be another type of wireless communications device and network entity 902 may be another type of network entity or network node, such as those described herein.

As shown in FIG. 9, network entity 902 may provide coverage in an anchor cell 905 (e.g., using an anchor carrier). Further, network entity 902 may provide coverage in non-anchor cells 910(1), 910(2), 910(3), and 910(4) (e.g., using a non-anchor carrier). As shown, non-anchor cells 910(1)-(4) overlap with anchor cell 905, and anchor cell 905 encompasses all of non-anchor cells 910(1)-(4). Further, as shown, non-anchor cells 910(1)-(4) are not concentric.

To enable UE 904 to perform an OD-SIB1 procedure in non-anchor cell 910(1), 910(2), 910(3), and/or 910(4), process flow 900 begins at 914 with network entity 902 sending and UE 904 receiving a first configuration for performing an OD-SIB1 procedure in a non-anchor cell. For example, the first configuration may be sent in anchor cell 905 (e.g., via the anchor carrier) of network entity 902.

The first configuration may be common to non-anchor cells 910(1)-(4), e.g., non-anchor cells overlapping only anchor cell 905 (e.g., non-anchor cells overlapping a single anchor cell). The first configuration may not be associated with non-anchor cells overlapping another anchor cell, such as non-anchor cells 910(5)-910(8) overlapping another anchor cell 912 shown in FIG. 9.

In certain aspects, the first configuration includes a configuration associated with SSBs reception in non-anchor cells 910(1)-(4). In particular, the first configuration may include an indication of a plurality of SSB occasions configured for receiving a set of SSBs in one or more bursts in non-anchor cells 910(1)-(4).

For example, in certain aspects, network entity 902 may use an antenna array to facilitate beamformed transmission of SSBs such that network entity 902 sweeps its corresponding cell volume with multiple beams, sending SSBs, directed in different spatial directions in a time-multiplexed manner. In this way, network entity 902 may periodically transmit an SSB burst set composed of one or more SSB bursts. Each SSB burst may include an SSB for each beam employed by network entity 902. Further, each SSB, within an SSB burst, may be identified by an index value, referred to as an "SSB index." The SSB index may represent the position of the SSB within an SSB burst.

Different SSB indices for different SSBs may be associated with different non-anchor cells 910(1)-(4). For example, SSB indices 0-3 may be associated with non-anchor cell 910(1) (e.g., indicating that SSBs transmitted in non-anchor cell 910(1) are transmitted with indices between and including 0-3), SSB indices 2-5 may be associated with non-anchor cell 910(2), SSB indices 3-6 may be associated with non-anchor cell 910(3), and SSB indices 5-8 may be associated with non-anchor cell 910(4). The SSB indices, representing positions of SSBs in an SSB burst, associated with all of the non-anchor cells 910 corresponding to the first configuration may be indicated in the first configuration via a field ssb-PositioninBurst.

In some aspects, the first configuration may include a mapping between SSB occasions configured for receiving SSBs at UE 904 from network entity 902 and ROs. As described herein, an RO may correspond to one or more time-frequency resources available for transmitting a preamble during a RACH procedure. In some aspects described herein, a preamble transmitted during one or more of these ROs may include a request, from UE 904 to network entity 902, to send an OD-SIB1. For example, UE 904 may receive an SSB in a first SSB occasion in the non-anchor cell 910(1). The first SSB occasion may map to a first RO occasion. Thus, based at least in part on receiving the SSB in the first SSB occasion, UE 904 may send, in the first RO, a RACH preamble including a request to send an OD-SIB1.

In some aspects, the first configuration may include a value for a field ss-PBCH-BlockPower. The value for the field ss-PBCH-BlockPower may indicate a power at which network entity 902 transmits SSBs. In some aspects, UE 904 may use this value to estimate the path loss as the difference between the indicated value (e.g., indicated power) and the SSB power that is measured by UE 904.

In some aspects, the first configuration may include a value for a field rsrp-ThresholdSSB. UE 904 may use this indicated value to select a non-anchor cell for sending an OD-SIB1 request. For example, UE 904 may determine to initiate an OD-SIB1 procedure in a non-anchor cell 910(1), 910(2), 910(3), or 910(4) based on an SSB transmitted in the corresponding non-anchor cell having a reference signal received power (RSRP) greater than the value indicated for the field rsrp-ThresholdSSB.

UE 904 may use this SSB configuration information included in the first configuration to receive SSBs in first non-anchor cell 910(1), second non-anchor cell 910(2), third non-anchor cell 910(3), and/or fourth non-anchor cell 910 (4). For example, as shown at 916 in FIG. 9, UE 904 receives a first SSB including an MIB in first non-anchor cell 910(1). Further, UE 904 receives, at 918, a second SSB including an MIB in second non-anchor cell 910(2). At 920, UE 904 measures the first SSB and the second SSB to determine one or more channel conditions (e.g., RSRP, signal-to-noise ratio (SNR), a channel quality, etc.) in non-anchor cell 910(1) and non-anchor cell 910(2). UE 904 may determine to perform an OD-SIB1 procedure in non-anchor cell 910(1) or non-anchor cell 910(2) based on the determined channel conditions. For example, UE 904 may determine to perform the OD-SIB1 procedure in first non-anchor cell 910(1) based on the RSRP measured for first non-anchor cell 910(1) being greater than RSRP measured for second non-anchor cell 910(2). Although the example depicts UE 904 receiving SSBs in only first non-anchor cell 910(1) and second non-anchor cell 910(2), in certain other examples, UE 904 may receive SSBs in any of first non-anchor cell 910(1), second non-anchor cell 910(2), third non-anchor cell 910(3), and/or fourth non-anchor cell 910(4).

To initiate the OD-SIB1 procedure in non-anchor cell 910(1), UE 904 may send, at 922 in first non-anchor cell 910(1), a request to send an OD-SIB1. In certain aspects, the OD-SIB1 procedure is performed during a RACH procedure used to establish an RRC connection between UE 904 and network entity 902. Thus, the OD-SIB1 request may be sent to network entity 902, at 922, during a RACH procedure. In certain aspects, the OD-SIB1 request is sent to network entity 902 via a random access preamble used to initiate the RACH procedure. For example, the OD-SIB1 request may be sent as part of MSG3 described and depicted at 814 in FIG. 8A or MSGA/MSG1 described and depicted at 852 in FIG. 8B.

In certain aspects, the first configuration received, at UE 904 at 914, includes a configuration for sending this OD-SIB1 request as part of a random access procedure. For example, in certain aspects, the first configuration may include an indication of an uplink BWP to use for performing a random access procedure for sending OD-SIB1 requests. As used herein, a BWP is a designated portion of the overall bandwidth of a cell (e.g., of first non-anchor cell 910(1)). In certain aspects, the first configuration may include information about a location of the uplink BWP, a bandwidth of the uplink BWP, an SCS of the uplink BWP, and/or a cyclic prefix (CP) of the uplink BWP. In certain aspects, the first configuration may include a parameter absoluteFrequencyPointA, which represents the frequency location of point A expressed as in an absolute radio-frequency channel number (ARFCN). It provides an absolute frequency position of the reference resource block (e.g., a common resource block 0) whose lowest subcarrier is Point A.

In certain aspects, the first configuration may include a RACH configuration for sending the random access preamble used to initiate the random access procedure and including the OD-SIB1 request. The RACH configuration may indicate a plurality of ROs configured for sending the OD-SIB1 requests during the random access procedure, including the request to send the OD-SIB1 at 922. Further, in certain aspects, the RACH configuration may configure one or more RACH parameters. For example, the RACH configuration may configure a prach-ConfigurationIndex parameter for the random access procedure. The value of this parameter may indicate the available set of RACH occasions for the transmission of the random access preamble, including the OD-SIB1 request. In certain aspects, the RACH configuration may configure a frequency domain resource allocation (FDRA) for the transmission of the random access preamble, including the OD-SIB1 request. For example, the RACH configuration may include RRC parameters msg1-FDM and msg1-FrequencyStart used to determine the FDRA. In certain aspects, the RACH configuration may configure a time domain resource allocation (TDRA) for the transmission of the random access preamble, including the OD-SIB1 request. For example, the first configuration may include RRC parameter prach-ConfigurationIndex used to determine the TDRA. In certain aspects, RRC parameter prach-ConfigurationIndex indicates a mapping between a plurality of SSB occasions and a plurality of ROs for sending random access preambles including OD-SIB1 requests. In certain aspects, the RACH configuration may further configure a physical RACH (PRACH) root sequence index parameter (prach-RootSequenceIndex), a zero correlation zone configuration parameter (zeroCorrelationZoneConfig), a restricted set configuration parameter (restrictedSetConfig), a random access preamble index parameter (ra-PreambleIndex), a random access preamble SCS parameter (msg1-SubcarrierSpacing), or a random access procedure target power level parameter (preamble ReceivedTargetPower).

As described with respect to 914, the first configuration received by UE 904 is common to multiple non-anchor cells, and specifically non-anchor cells 910(1)-(4) in FIG. 9. As such, when the first configuration includes the RACH configuration (e.g., used for sending random access preamble(s) including the OD-SIB1 request(s)), the RACH configuration may also be associated with non-anchor cells 910(1)-(4). Accordingly, use of the RACH configuration to send OD-SIB1 requests to network entity 902, such as the OD-SIB1 request sent at 922, may enable the OD-SIB1 requests to be detected in each of the non-anchor cell 910(1)-(4) associated with the first configuration. UE 904 transmitting the OD-SIB1 request at 922, for example, may want to request an OD-SIB1 in one of the non-anchor cells 910, however. Specifically, in FIG. 9, UE 904 may desire to send the request in non-anchor cell 910(1), such that an OD-SIB1 is sent in the first non-anchor cell 910(1) and not in the second non-anchor cell 910(2), not in the third non-anchor cell 910(3), and/or not in the fourth non-anchor cell 910(4).

As such, in certain aspects, to avoid (1) detection of the OD-SIB1 request and (2) unnecessary OD-SIB1 transmission in multiple non-anchor cells 910 associated with the first configuration, different techniques may be considered to direct the OD-SIB1 request to a specific non-anchor carrier associated with a specific non-anchor cell 910. For example, the techniques may randomize the RACH configuration across the non-anchor cells 910.

In particular, a first technique may include randomizing a root sequence index of a random access preamble, used to carry the OD-SIB1 request, based on a physical cell identifier (ID) (simply referred to herein as a "cell ID") of a non-anchor cell for which the OD-SIB1 request is intended for. In particular, in FIG. 9, to direct the OD-SIB1 request to network entity 902 in the first non-anchor cell 910(1), a root sequence index of the random access preamble, including the OD-SIB1 request, may be randomized based on a cell ID of first non-anchor cell 910(1). For example, the root sequence index of the random access preamble (e.g., prach-RootSequenceIndex-NIDcell) may be randomized using the following equation:

$$prach-RootSequenceIndex-NIDcell = (prach-RootSequenceIndex+NIDcell)\%\ LRA$$

where prach-RootSequenceIndex is the PRACH root sequence index parameter provided as part of the RACH configuration, NIDcell represents the cell ID of non-anchor cell 910(1), LRA represents the length of the random access preamble sequence, and % represents a modulo operation.

A second technique may include randomizing a preamble index of a random access preamble, used to carry the OD-SIB1 request, based on a cell ID of a non-anchor cell for which the OD-SIB1 request is intended for. In particular, in FIG. 9, to direct the OD-SIB1 request to network entity 902 in the first non-anchor cell 910(1), a preamble index of the random access preamble, including the OD-SIB1 request, may be randomized based on a cell ID of non-anchor cell 910(1). For example, the preamble index of the random access preamble (e.g., ra-PreambleIndex-NIDcell) may be randomized using the following equation:

$$ra-PreambleIndex-NIDcell=(ra-PreambleIndex+NIDcell)\%64$$

where ra-PreambleIndex is the random access preamble index parameter provided as part of the RACH configuration and NIDcell represents the cell ID of non-anchor cell 910(1).

A third technique may include randomizing a starting frequency of a resource used for sending a random access preamble, used to carry the OD-SIB1 request, based on a cell ID of a non-anchor cell for which the OD-SIB1 request is intended for. In particular, in FIG. 9, to direct the OD-SIB1 request to network entity 902 in the first non-anchor cell 910(1), a starting frequency of a resource used for sending the random access preamble, including the OD-SIB1 request, may be randomized based on a cell ID of non-anchor cell 910(1). For example, the starting frequency of a resource (e.g., msg1-FrequencyStart-NIDcell) may be randomized using the following equation:

$$msg1-FrequencyStart-NIDcell = msg1-FrequencyStart+(NIDcell\ \%\ msg1-FDM)*numRBsPerRO$$

where msg1-FrequencyStart and msg1-FDM are RRC parameters provided as part of the RACH configuration (e.g., as described above), NIDcell represents the cell ID of non-anchor cell 910(1), and numRBsPerRO represents the number of resource blocks per RO.

Figures 10, 11:
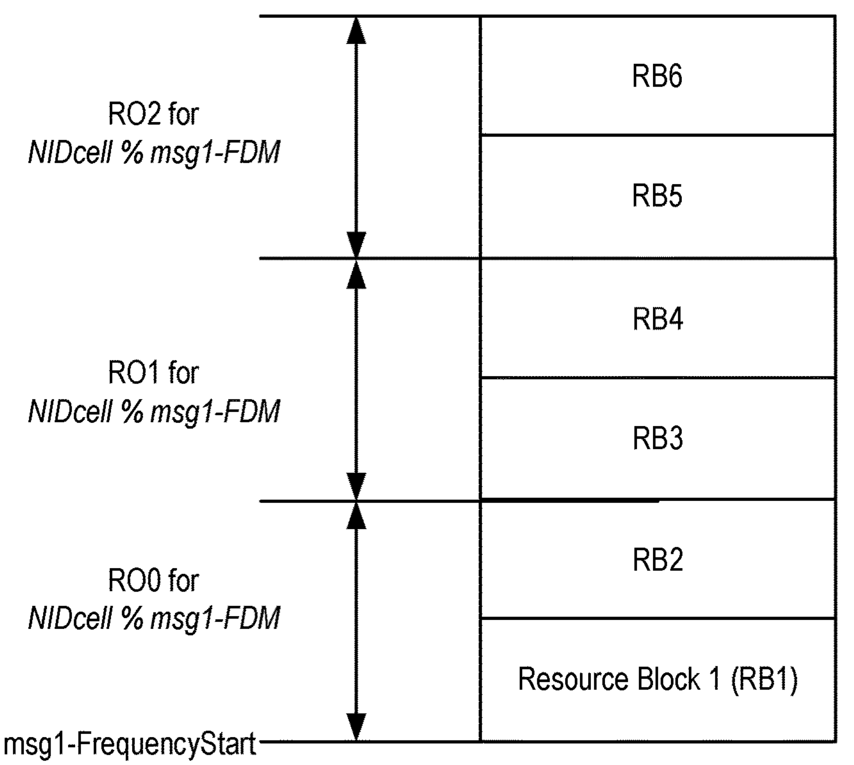
FIG. 10 depicts example randomization of the starting frequency of resources used for sending random access preambles in different non-anchor cells.
FIG. 11 depicts an example master information block.

FIG. 10 depicts example randomization of the starting frequency of resources used for sending random access preambles in different non-anchor cells. For example, as shown, ROs used for sending random access preambles in different non-anchor cells may be different based on the randomization of the starting frequency of the ROs based on parameter NIDcell % msg1-FDM for each non-anchor cell.

Returning to FIG. 9, in response to sending the request to receive an OD-SIB1 (e.g., based on the first configuration), UE 904 may receive, at 924, an OD-SIB1. For example, at 924, UE 904 may receive, in first non-anchor cell 910(1), the OD-SIB1.

In certain aspects, reception of the OD-SIB1 may be based on the first configuration received by UE 904 at 914. For example, the first configuration may include a downlink configuration for receiving one or more OD-SIB1s in non-anchor cells 910(1)-(4), including receiving the OD-SIB1 in non-anchor cell 910(1) at 924. In certain aspects, the downlink configuration included in the first configuration (e.g., sent to UE 904 in anchor cell 905) may include an indication of a downlink BWP to use for performing an OD-SIB1 reception, including reception of the OD-SIB1 at 924. In certain aspects, the downlink configuration included in the first configuration may include one or more occasions configured for receiving DCI scheduling one or more OD-SIB1s during the OD-SIB1 reception, including reception of the OD-SIB1 at 924. In cases where the reception of the OD-SIB1 is based on a downlink configuration included in the first configuration received at 914, an OD-SIB1 sent to and received by UE 904 (e.g., such as the OD-SIB1 received at 924) may be a unicast transmission.

In certain other aspects, reception of the OD-SIB1 may be based on information included in an SSB from network entity 902, such as first SSB sent to and received by UE 904 at 916. For example, in certain aspects, the SSB may include an indication of one or more occasions configured for receiving DCI scheduling one or more OD-SIB1s during the OD-SIB1 reception, including the OD-SIB1 at 924.

Further, in certain aspects, the SSB may include an indication of a downlink BWP to use for performing an OD-SIB1 reception, including reception of the OD-SIB1 at 924. In one example, the downlink BWP may be indicated via a pdcch-ConfigSIB1 field in an MIB of the SSB. For example, as shown in FIG. 11, MIB 1102 (e.g., which may be provided as part of the SSB sent to and received by UE 904 at 916) includes a pdcch-ConfigSIB1 field indicating a downlink BWP to use for OD-SIB1 reception (e.g., shown at 1104). UE 904 may monitor PDCCH from a Type 0 search space (e.g., also referred to as a Type 0 PDCCH common search space (CSS), which is a subset of a PDCCH search space that is dedicated to transmit the PDCCH for a SIB) for the OD-SIB1 reception. In cases where the reception of the OD-SIB1 is based on information included in an SSB (and more specifically and MIB included as part of the SSB), an OD-SIB1 sent to and received by UE 904 (e.g., such as the OD-SIB1 received at 924) may be a unicast transmission or a broadcast transmission (e.g., similar to legacy SIB1).

After receiving the OD-SIB1 at 924, UE 904 may proceed, at 926, with establishing an RRC connection with network entity 902 in first non-anchor cell 910(1). For example, UE 904 may complete a random access procedure in first non-anchor cell 910(1) based at least in part on information included in the OD-SIB1.

Although not shown in FIG. 9, in certain aspects, UE 904 may send to network entity 902 HARQ ACK/NACK feedback for the OD-SIB1 received at 924. For example, UE 904 may send HARQ ACK/NACK feedback for OD-SIB1(s) based on an uplink configuration (e.g., a PUCCH configuration) for sending such HARQ ACK/NACK feedback included within the first configuration received at 914.

Figure 12:
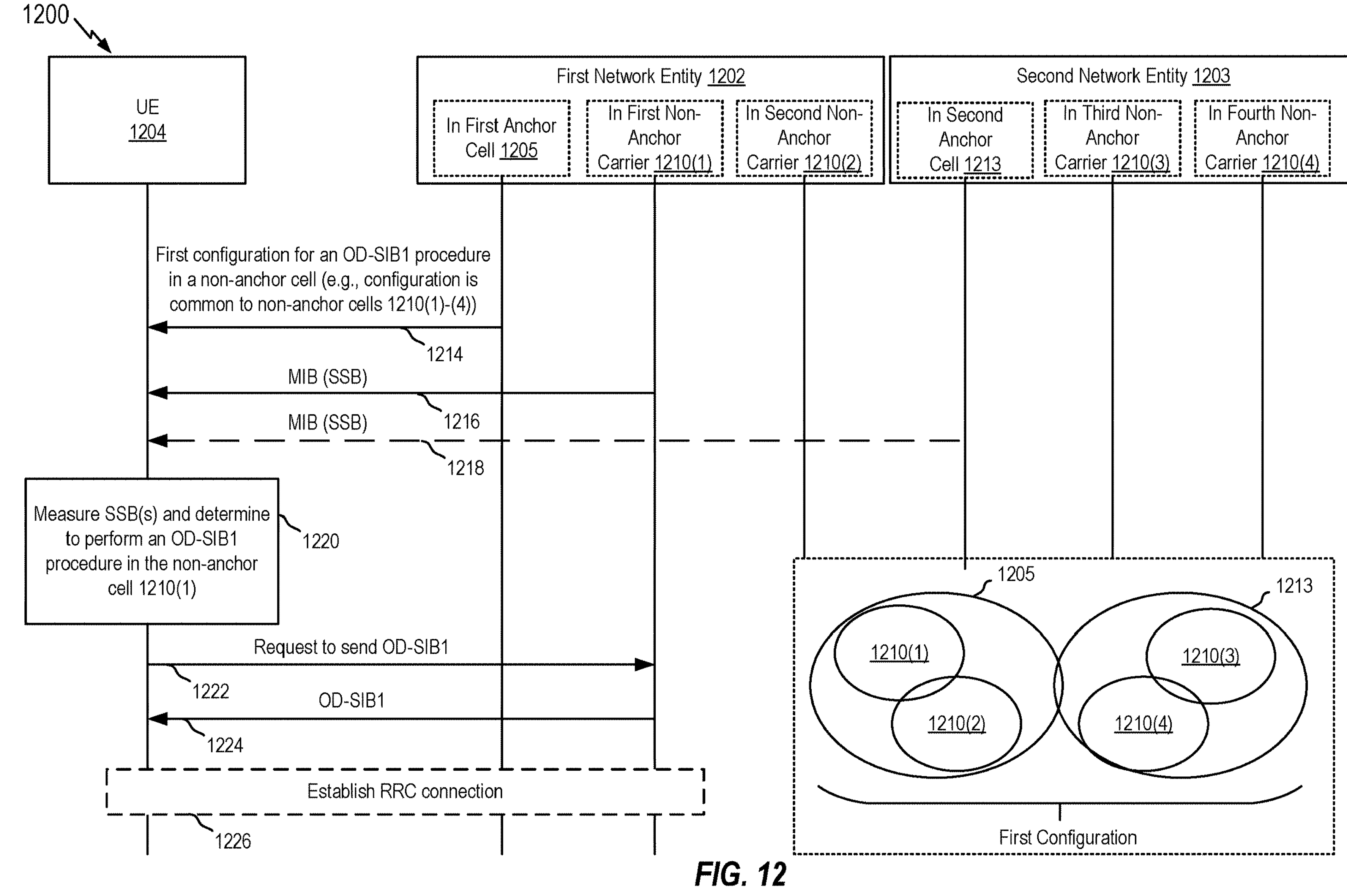
FIG. 12 depicts another process flow for communications in a network between a network entity and a UE for performing an on-demand system information block 1 procedure.

FIG. 12 depicts a process flow 1200 for communications in a network between a first network entity 1202 and a UE 1204 for performing an OD-SIB1 procedure. In some aspects, the first network entity 1202 may be an example of the BS 102 depicted and described with respect to FIGS. 1 and 3 or a disaggregated base station depicted and described with respect to FIG. 2. Similarly, the UE 1204 may be an example of UE 104 depicted and described with respect to FIGS. 1 and 3. However, in other aspects, UE 1204 may be another type of wireless communications device and first network entity 1202 may be another type of network entity or network node, such as those described herein.

As shown in FIG. 12, first network entity 1202 may provide coverage in a first anchor cell 1205 (e.g., using an anchor carrier). Further, first network entity 1202 may provide coverage in non-anchor cells 1210(1) and 1210(2) (e.g., using a non-anchor carrier). As shown, non-anchor cells 1210(1)-(2) overlap with first anchor cell 1205, and first anchor cell 1205 encompasses all of non-anchor cells 1210(1)-(4). Further, as shown, non-anchor cells 1210(1)-(4) are not concentric.

To enable UE 1204 to perform an OD-SIB1 procedure in non-anchor cell 1210(1) and/or 1210(2), process flow 1200 begins, at 1214, with first network entity 1202 sending and UE 1204 receiving a first configuration for an OD-SIB1 procedure in a non-anchor cell. For example, the first configuration may be sent in first anchor cell 1205 of first network entity 1202.

Unlike FIG. 9 where the first configuration is common to non-anchor cells overlapping only one anchor cell, in FIG. 12, the first configuration may be common to non-anchor cells overlapping a group of anchor cells, where the group of anchor cells includes two or more anchor cells. For example, as shown in FIG. 12, the first configuration may be common to non-anchor cells 1210(1) and 1210(2) overlapping the first anchor cell 1205 associated with first network entity 1202, as well as non-anchor cells 1210(3) and 1201(4) overlapping a second anchor cell 1213 associated with a second network entity 1203.

In certain aspects, the first configuration may be common to non-anchor cells overlapping a group of anchor cells, where the group of anchor cells are explicitly identified. For example, the anchor cells in the group may be anchor cells assigned to the group and associated with a same OD-SIB1 anchor cell group ID (e.g., OD-SIB1-Anchor-Cell-group-ID). The anchor cells may be identified explicitly based on the OD-SIB1 anchor cell group ID in a SIB1 in first anchor cell 1205 and/or in second anchor cell 1213.

In certain aspects, the first configuration may be common to non-anchor cells overlapping a group of anchor cells, where the group of anchor cells are implicitly identified. For example, the group of anchor cells may be implicitly identified based on an existing cell group definition, such as a group of anchor cells belonging to a paging cell group, a group of anchor cells belonging to a cell group associated with a first tracking area, etc.

Similar to FIG. 9, the first configuration received at 1214 may include (1) a configuration associated with SSB(s) reception in non-anchor cells 1210(1)-(4), (2) an uplink configuration (e.g., RACH configuration) for sending one or more OD-SIB1 requests in non-anchor cells 1210(1)-(4), (3) a downlink configuration for receiving one or more OD-SIB1s in non-anchor cells 1210(1)-(4), and/or (4) a configuration for sending, in non-anchor cells 1210(1)-(4), HARQ ACK/NACK feedback in response to the one or more OD-SIB1s.

Further, similar to FIG. 9, UE 1204 may use the first configuration to receive SSB(s), send OD-SIB1 request(s), and/or receive OD-SIB1(s). For example, UE 1204 may perform steps 1216-1226 in FIG. 12, which are similar to steps 916-926 depicted and described with respect to FIG. 9.

In certain aspects, instead of an OD-SIB1 configuration including only parameters common to a plurality of non-anchor cells (e.g., as shown in FIG. 9 and FIG. 12), the OD-SIB1 configuration may include some parameter(s) (e.g., a downlink configuration) common to a plurality of non-anchor cells and some other parameter(s) (e.g., an uplink configuration) specific to each non-anchor cell of the plurality of non-anchor cells.

Figure 13:
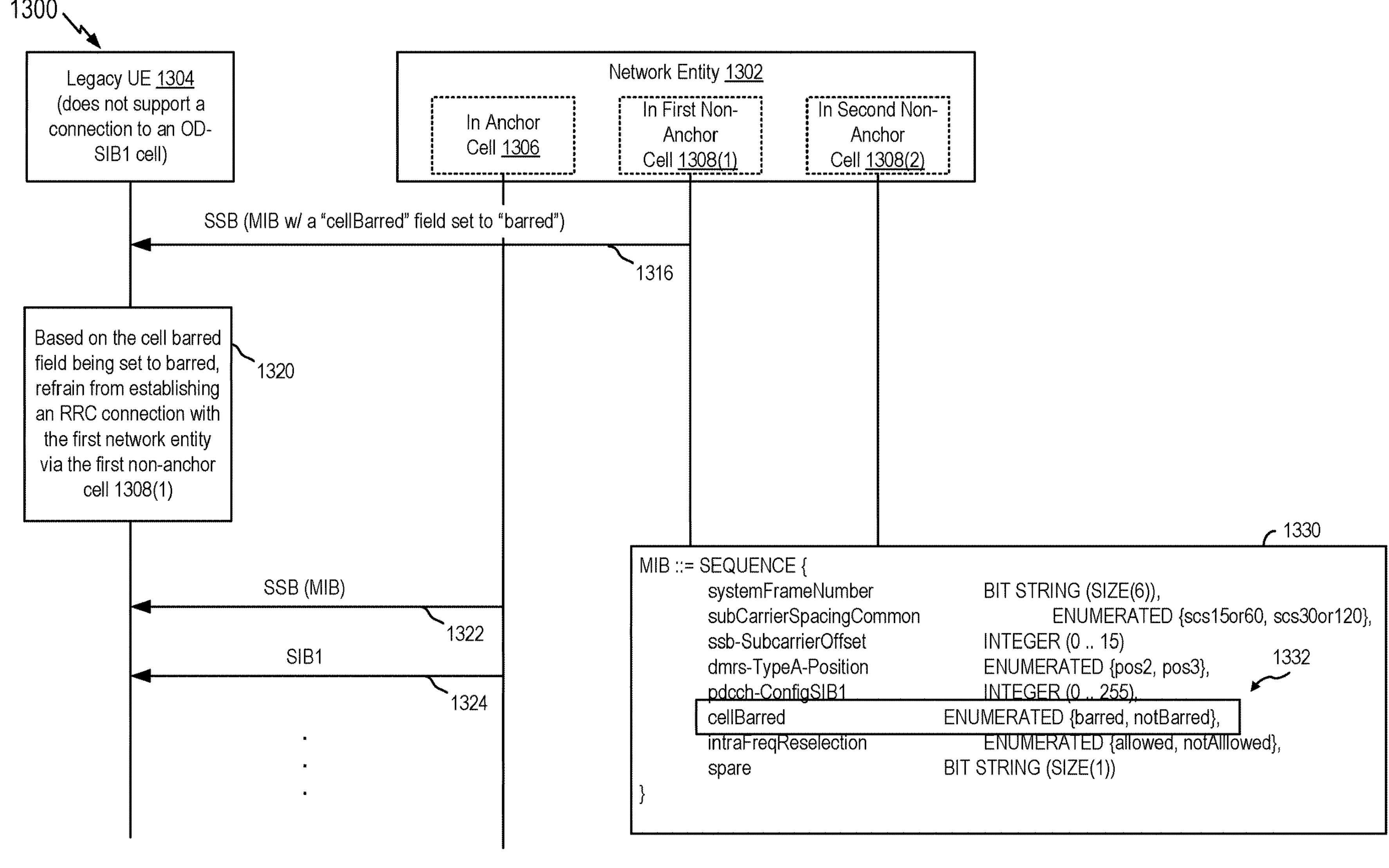
FIG. 13 depicts a process flow for communications in a network between a network entity and a legacy UE for preventing the legacy UE from attempting to establish a radio resource connection in a non-anchor cell associated with the network entity.

FIG. 13 depicts a process flow 1300 for communications in a network between a network entity 1302 and a legacy UE 1304 for preventing the legacy UE from attempting to establish a radio resource connection in a non-anchor cell that supports OD-SIB1 transmission and is associated with the network entity. In some aspects, the network entity 1302 may be an example of the BS 102 depicted and described with respect to FIGS. 1 and 3 or a disaggregated base station depicted and described with respect to FIG. 2. Similarly, the legacy UE 1304 may be an example of UE 104 depicted and described with respect to FIGS. 1 and 3. However, in other aspects, legacy UE 1304 may be another type of wireless communications device and network entity 1302 may be another type of network entity or network node, such as those described herein.

In FIG. 13, network entity 1302 may provide coverage in an anchor cell 1306. Further, network entity 1302 may provide coverage in non-anchor cells 1308(1), 1380(2). The non-anchor cells 1308(1), 1308(2) may support OD-SIB1 transmission (e.g., support performing an OD-SIB1 procedure in each of the non-anchor cells 1308(1), 1308(2)).

To prevent a legacy UE (e.g., a UE that does not support connection to a non-anchor cell where OD-SIB1 transmission is supported) from camping on and attempting to establish an RRC connection in the non-anchor cells 1308 (1), 1308(2), SSBs broadcast in each of the non-anchor cells 1308(1), 1308(2) may include a cellBarred field, in an MIB of each SSB, set to "barred."

For example, in FIG. 13, legacy UE 1304 may determine to establish an RRC connection with network entity 1302 and thus begin monitoring for SSBs from network entity 1302. Based on the monitoring, legacy UE 1304 may detect an SSB transmitted in first non-anchor cell 1308(1) at 1316. To prevent any legacy UE, including legacy UE 1304, from establishing a connection with network entity 1302 in first non-anchor cell 1308(1), the SSB may include an MIB with a cellBarred field set to "barred," as shown at 1332 in example MIB 1330.

At 1320, based on the cellBarred field set to "barred," legacy UE 1304 may refrain from establishing an RRC connection with network entity 1302 in the first non-anchor cell 1308(1). Instead, legacy UE 1304 may again monitor for SSBs. Based on the monitoring, legacy UE 1304 may receive, at 1322 in anchor cell 1306 of network entity 1302, an SSB. Because SIB1 is continuously transmitted in anchor cell 1306 (e.g., without requiring an OD-SIB1 request), a cellBarred field of an MIB included in the SSB may be set to "not barred". After receiving the SSB, legacy UE 1304 may monitor for and receive, at 1324, in anchor cell 1306 of network entity 1302, a SIB1. With this information, UE 1304 may proceed with performing a random access procedure to establish an RRC connection with network entity 1302.

In some other examples, a UE that supports connecting to a non-anchor cell where an OD-SIB1 procedure may be performed, may also receive, in the non-anchor cell, an SSB including the cellBarred field set to "barred." Unlike the legacy UE, however, the UE may ignore the fact that the cellBarred field is set to "barred." Instead, the UE may proceed with sending an OD-SIB1 request in the non-anchor cell.

In some cases, the OD-SIB1 received by the UE in response to sending the OD-SIB1 request may also include a cellBarred field. If the cellBarred field is set to "not barred" in the OD-SIB1 sent to the UE, then the UE may proceed with establishing an RRC connection with the network entity in the non-anchor cell. Alternatively, if the cellBarred field is set to "barred" in the OD-SIB1 sent to the UE, then the UE may refrain from establishing the RRC connection with the network entity in the non-anchor cell. Instead, the UE may attempt to establish an RRC connection with the network entity in another non-anchor cell associated with the network entity or in an anchor cell associated with the network entity.

Example Operations

Figure 14:
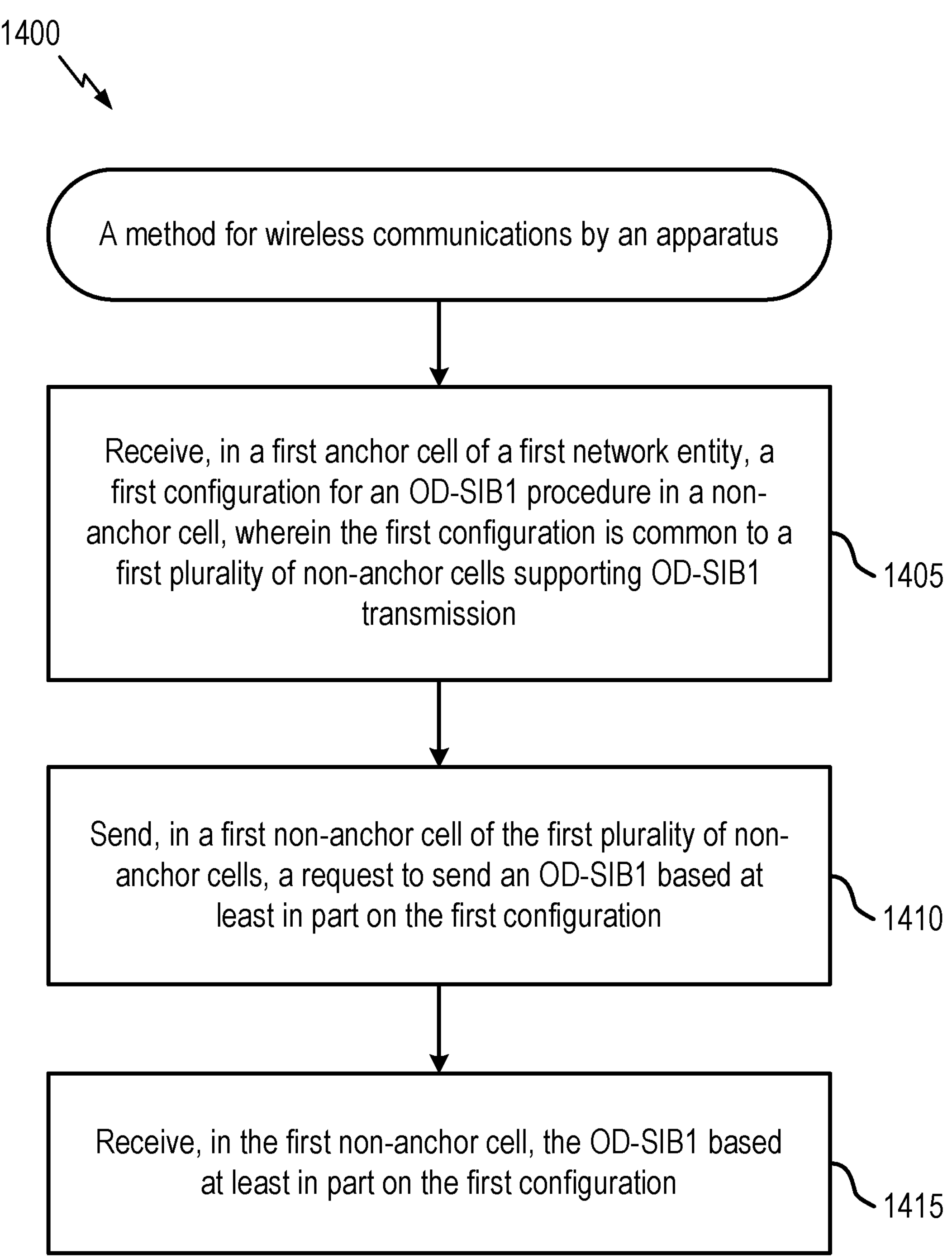
FIG. 14 depicts a method for wireless communications.

FIG. 14 shows a method 1400 for wireless communications by an apparatus, such as UE 104 of FIGS. 1 and 3.

Method 1400 begins at block 1405 with receiving, in a first anchor cell of a first network entity, a first configuration for an OD-SIB1 procedure in a non-anchor cell, wherein the first configuration is common to a first plurality of non-anchor cells supporting OD-SIB1 transmission. As described herein, technical benefits associated with providing a first configuration common to a first plurality of non-anchor cells include (1) reduced signaling overhead and/or (2) reduced power consumption at the apparatus and/or the first network entity, when compared to providing and using cell-specific configurations for performing OD-SIB1 procedures.

Method 1400 then proceeds to block 1410 with sending, in a first non-anchor cell of the first plurality of non-anchor cells, a request to send an OD-SIB1 based at least in part on the first configuration.

Method 1400 then proceeds to block 1415 with receiving, in the first non-anchor cell, the OD-SIB1 based at least in part on the first configuration.

In certain aspects, a plurality of non-anchor cells, including the first non-anchor cell, correspond to a same frequency.

In certain aspects, a first coverage area associated with each of the first plurality of non-anchor cells overlaps a second coverage area associated with the first anchor cell, and the second coverage area covers a geographic location of the apparatus.

In certain aspects, the method 1400 further comprises receiving, in a second anchor cell, a second configuration for the OD-SIB1 procedure in the non-anchor cell based at least in part on a relocation of the apparatus from within the second coverage area to within a third coverage area associated with the second anchor cell, wherein: the second configuration is common to a second plurality of non-anchor cells supporting OD-SIB1 transmission, and a fourth coverage area associated with each of the second plurality of non-anchor cells overlaps the third coverage area associated with the second anchor cell.

In certain aspects, first coverage areas associated with the first plurality of non-anchor cells overlap second coverage areas associated with a first plurality of anchor cells, including the first anchor cell.

In certain aspects, each of the first plurality of anchor cells is associated with a same first cell group, comprising: an OD-SIB1 anchor cell group; a paging cell group; or a cell group associated with a first tracking area.

In certain aspects, the method 1400 further comprises receiving, in a second anchor cell associated with a second cell group, a second configuration for the OD-SIB1 procedure in the non-anchor cell based at least in part on a relocation of the apparatus from within one of the second coverage areas to within a third coverage area associated with the second anchor cell.

In certain aspects, the first configuration comprises at least one of: a second configuration associated with SSBs reception in the first plurality of non-anchor cells; a third configuration for sending one or more OD-SIB1 requests, including the request to send the OD-SIB1; a fourth configuration for receiving one or more OD-SIB1s, including the OD-SIB1; or a fifth configuration for sending HARQ ACK or NACK feedback in response to the one or more OD-SIB1s.

In certain aspects, the first configuration comprises: an indication of a downlink BWP to use for performing an OD-SIB1 reception; and one or more occasions configured for receiving DCI scheduling one or more OD-SIB1s during the OD-SIB1 reception, including the OD-SIB1.

In certain aspects, the OD-SIB1 comprises a unicast transmission.

In certain aspects, the first configuration comprises one or more parameters associated with SSBs received in the first plurality of non-anchor cells.

In certain aspects, method 1400 further includes receiving, in the first non-anchor cell, an SSB comprising an indication of at least one of: a downlink BWP to use for performing an OD-SIB1 reception; or one or more occasions configured for receiving DCI scheduling one or more OD-SIB1s during the OD-SIB1 reception, including the OD-SIB1.

In certain aspects, the OD-SIB1 comprises a unicast transmission or a broadcast transmission.

In certain aspects, the first configuration comprises: an indication of an uplink BWP to use for performing a RACH procedure for sending OD-SIB1 requests; a plurality of ROs configured for sending the OD-SIB1 requests during the RACH procedure, including the request to send the OD-SIB1; and one or more parameters for the RACH procedure.

In certain aspects, the first configuration further comprises: a plurality of SSB occasions configured for receiving a set of SSBs in one or more SSB bursts in the first plurality of non-anchor cells; and a mapping between the plurality of SSB occasions and the plurality of ROs.

In certain aspects, block 1410 includes sending the request via a random access preamble used to initiate the RACH procedure.

In certain aspects, the one or more parameters for the RACH procedure comprise a configured PRACH root sequence index, and a root sequence index of the random access preamble is based at least in part on the configured PRACH root sequence index parameter and a cell identifier of the first non-anchor cell.

In certain aspects, the one or more parameters for the RACH procedure comprise a configured random access preamble index parameter, and a preamble index of the random access preamble is based at least in part on the configured random access preamble index parameter and a cell identifier of the first non-anchor cell.

In certain aspects, the one or more parameters for the RACH procedure comprise one or more configured FDRA parameters, and a starting frequency of a resource using for sending the random access preamble is based at least in part on the one or more configured FDRA parameters and a cell identifier of the first non-anchor cell.

In certain aspects, method 1400 further includes receiving, in the first non-anchor cell, an SSB comprising a MIB with a cell barred field set to barred. As described herein, setting a cell barred field of an MIB to "barred" beneficially prevents legacy UEs from camping on the first non-anchor cell.

In certain aspects, method 1400 further includes ignoring the cell barred field set to barred, and wherein the request to send the OD-SIB1 is sent based at least in part on ignoring the cell barred field.

In certain aspects, the apparatus comprises a UE configured to support the OD-SIB1 procedure in the non-anchor cell.

In certain aspects, the OD-SIB1 comprises a cell barred field set to not barred, and the method 1400 further comprises establishing a RRC connection with the first network entity in the first non-anchor cell.

In certain aspects, the OD-SIB1 comprises a cell barred field set to barred, and the method 1400 further comprises: receiving an indication to establish an RRC connection with the first network entity; and refraining from establishing the RRC connection with the first network entity in the first non-anchor cell based at least in part on the OD-SIB1 comprising the cell barred field set to barred.

Figure 16:
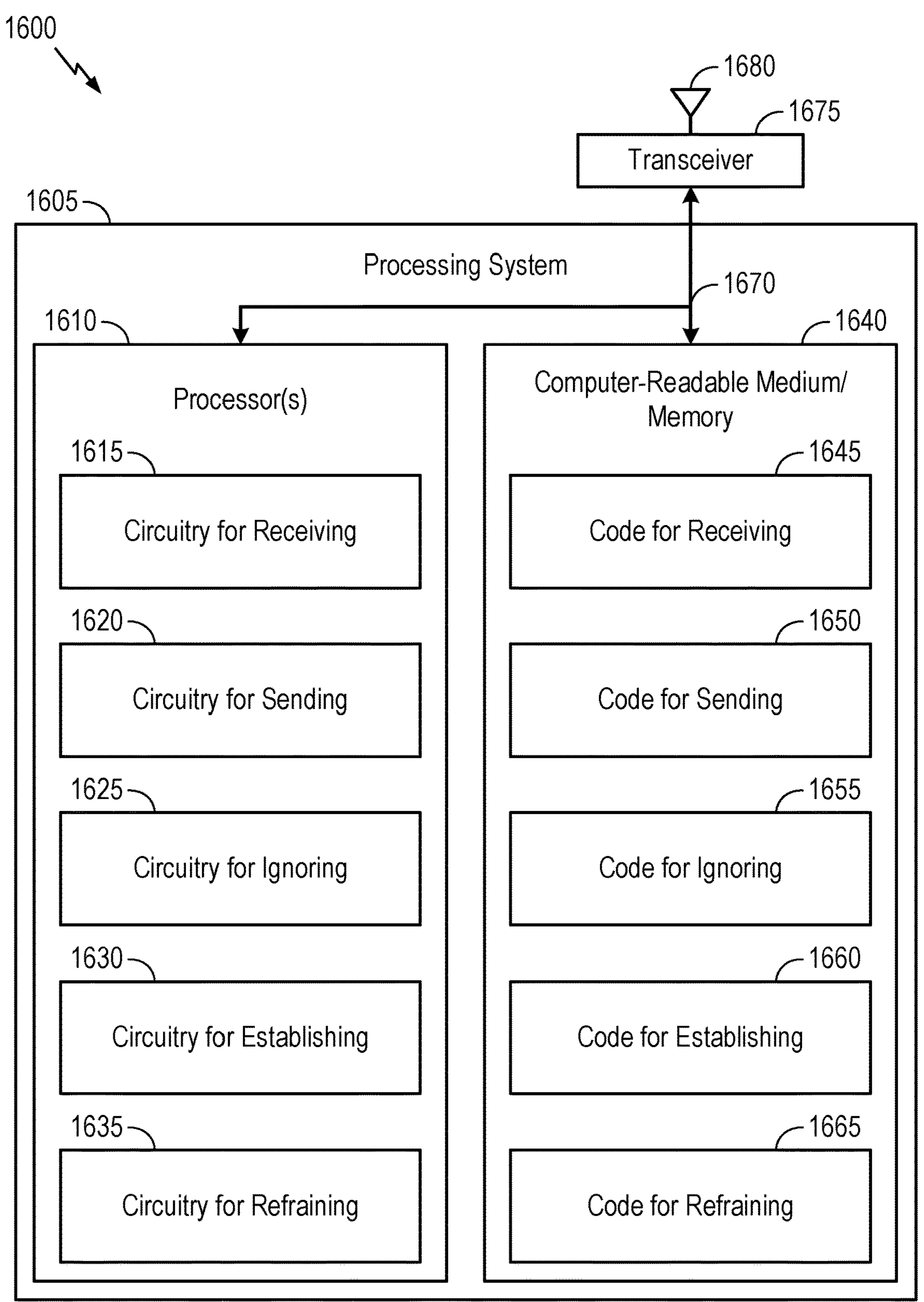
FIG. 16 depicts aspects of an example communications device.

In certain aspects, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative operations are possible consistent with this disclosure.

Figure 15:
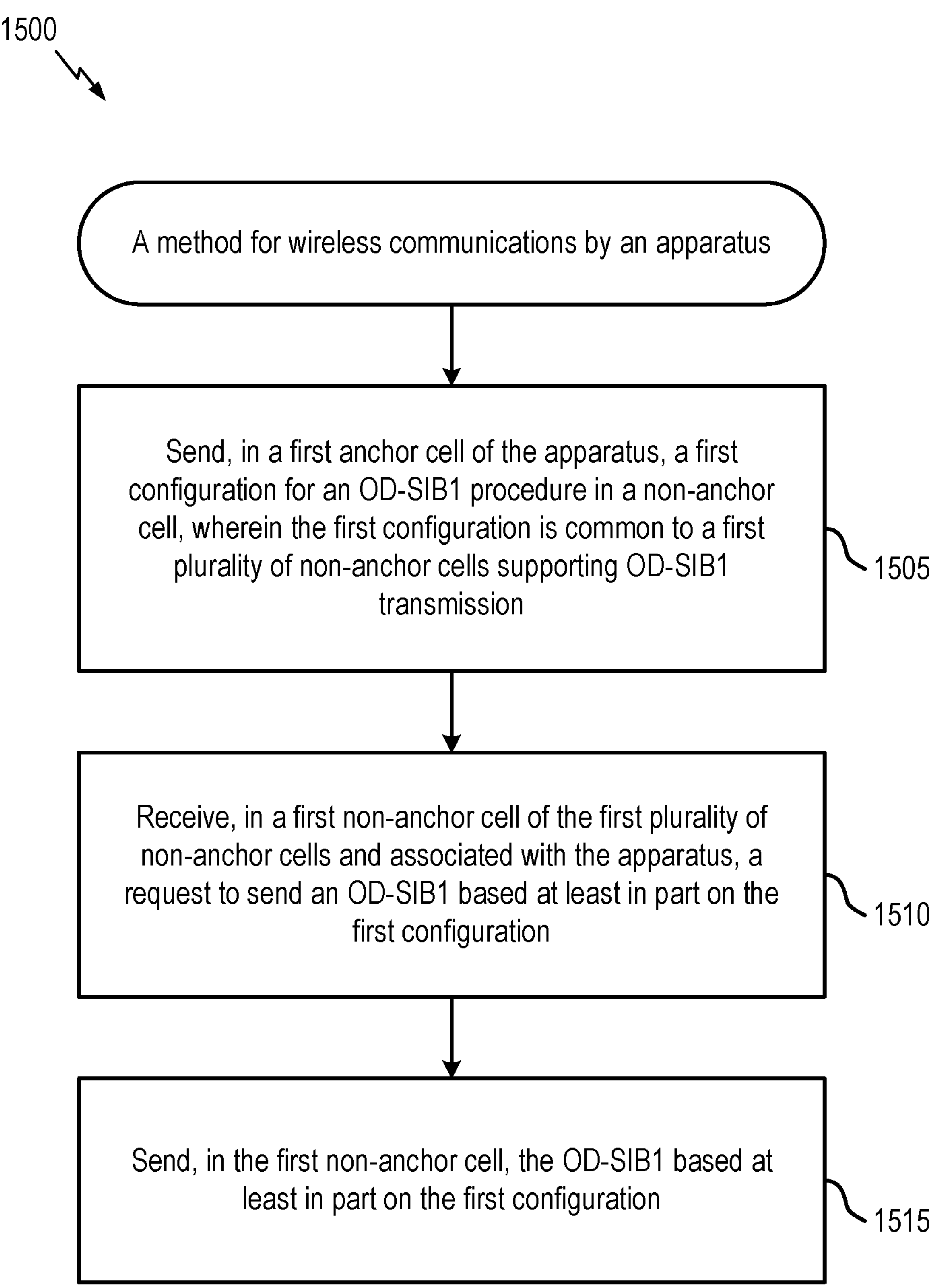
FIG. 15 depicts another method for wireless communications.

FIG. 15 shows a method 1500 for wireless communications by an apparatus, such as BS 102 of FIGS. 1 and 3, or a disaggregated base station as discussed with respect to FIG. 2.

Method 1500 begins at block 1505 with sending, in a first anchor cell of the apparatus, a first configuration for an OD-SIB1 procedure in a non-anchor cell, wherein the first configuration is common to a first plurality of non-anchor cells supporting OD-SIB1 transmission.

Method 1500 then proceeds to block 1510 with receiving, in a first non-anchor cell of the first plurality of non-anchor cells and associated with the apparatus, a request to send an OD-SIB1 based at least in part on the first configuration.

Method 1500 then proceeds to block 1515 with sending, in the first non-anchor cell, the OD-SIB1 based at least in part on the first configuration.

In certain aspects, a plurality of non-anchor cells, including the first non-anchor cell, correspond to a same frequency.

In certain aspects, a first coverage area associated with each of the first plurality of non-anchor cells overlaps a second coverage area associated with the first anchor cell.

In certain aspects, first coverage areas associated with the first plurality of non-anchor cells overlap second coverage areas associated with a first plurality of anchor cells, including the first anchor cell.

In certain aspects, each of the first plurality of anchor cells is associated with a same first cell group, comprising: an OD-SIB1 anchor cell group; a paging cell group; or a cell group associated with a first tracking area.

In certain aspects, the first configuration comprises at least one of: a second configuration associated with SSBs transmission in the first plurality of non-anchor cells; a third configuration for receiving one or more OD-SIB1 requests, including the request to send the OD-SIB1; a fourth configuration for transmitting one or more OD-SIB1s, including the OD-SIB1; or a fifth configuration for receiving HARQ ACK or NACK feedback in response to the one or more OD-SIB1s.

In certain aspects, the first configuration comprises: an indication of a downlink BWP associated with an OD-SIB1 transmission; and one or more occasions configured for sending DCI scheduling one or more OD-SIB1s during the OD-SIB1 transmission, including the OD-SIB1.

In certain aspects, the OD-SIB1 comprises a unicast transmission.

In certain aspects, the first configuration comprises one or more parameters associated with SSBs transmitted in the first plurality of non-anchor cells.

In certain aspects, method 1500 further includes sending, in the first non-anchor cell, an SSB comprising an indication of at least one of: a downlink BWP associated with an OD-SIB1 transmission; or one or more occasions configured for sending DCI scheduling one or more OD-SIB1s during the OD-SIB1 transmission, including the OD-SIB1.

In certain aspects, the OD-SIB1 comprises a unicast transmission or a broadcast transmission.

In certain aspects, the first configuration comprises: an indication of an uplink BWP to use for performing a RACH procedure for receiving OD-SIB1 requests; a plurality of ROs configured for receiving the OD-SIB1 requests during the RACH procedure, including the request to send the OD-SIB1; and one or more parameters for the RACH procedure.

In certain aspects, the first configuration further comprises: a plurality of SSB occasions configured for sending a set of SSBs in one or more SSB bursts in the first plurality of non-anchor cells; and a mapping between the plurality of SSB occasions and the plurality of ROs.

In certain aspects, block 1510 includes receiving the request via a random access preamble used to initiate the RACH procedure.

In certain aspects, the one or more parameters for the RACH procedure comprise a configured PRACH root sequence index, and a root sequence index of the random access preamble is based at least in part on the configured PRACH root sequence index parameter and a cell identifier of the first non-anchor cell.

In certain aspects, the one or more parameters for the RACH procedure comprise a configured random access preamble index parameter, and a preamble index of the random access preamble is based at least in part on the configured random access preamble index parameter and a cell identifier of the first non-anchor cell.

In certain aspects, the one or more parameters for the RACH procedure comprise one or more configured FDRA parameters, and a starting frequency of a resource associated with the random access preamble is based at least in part on the one or more configured FDRA parameters and a cell identifier of the first non-anchor cell.

In certain aspects, method 1500 further includes sending, in the first non-anchor cell, an SSB comprising a MIB with a cell barred field set to barred.

In certain aspects, the OD-SIB1 comprises a cell barred field set to not barred.

Figure 17:
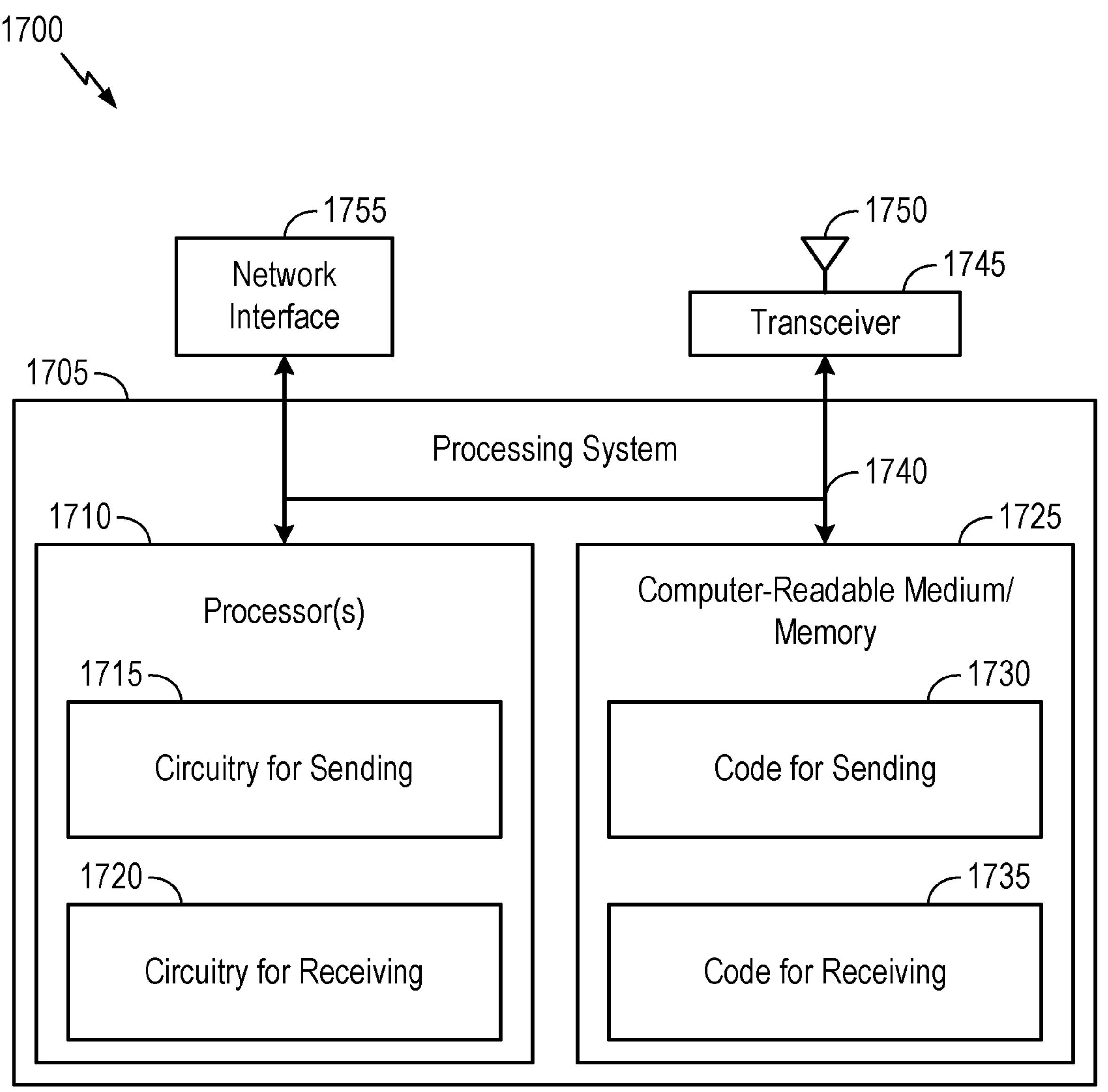
FIG. 17 depicts aspects of an example communications device.

In certain aspects, method 1500, or any aspect related to it, may be performed by an apparatus, such as communications device 1700 of FIG. 17, which includes various components operable, configured, or adapted to perform the method 1500. Communications device 1700 is described below in further detail.

Note that FIG. 15 is just one example of a method, and other methods including fewer, additional, or alternative operations are possible consistent with this disclosure.

Example Communications Devices

FIG. 16 depicts aspects of an example communications device 1600. In some aspects, communications device 1600 is a user equipment, such as UE 104 described above with respect to FIGS. 1 and 3.

The communications device 1600 includes a processing system 1605 coupled to a transceiver 1675 (e.g., a transmitter and/or a receiver). The transceiver 1675 is configured to transmit and receive signals for the communications device 1600 via an antenna 1680, such as the various signals as described herein. The processing system 1605 may be configured to perform processing functions for the communications device 1600, including processing signals received and/or to be transmitted by the communications device 1600.

The processing system 1605 includes one or more processors 1610. In various aspects, the one or more processors 1610 may be representative of one or more of receive processor 358, transmit processor 364, TX MIMO processor 366, and/or controller/processor 380, as described with respect to FIG. 3. The one or more processors 1610 are coupled to a computer-readable medium/memory 1640 via a bus 1670. In certain aspects, the computer-readable medium/memory 1640 is configured to store instructions (e.g., computer-executable code) that when executed by the one or more processors 1610, enable and cause the one or more processors 1610 to perform the method 1400 described with respect to FIG. 14, or any aspect related to it, including any operations described in relation to FIG. 14. Note that reference to a processor performing a function of communications device 1600 may include one or more processors performing that function of communications device 1600, such as in a distributed fashion.

In the depicted example, computer-readable medium/memory 1640 stores code for receiving 1645, code for sending 1650, code for ignoring 1655, code for establishing 1660, and code for refraining 1665. Processing of the code 1645-1665 may enable and cause the communications device 1600 to perform the method 1400 described with respect to FIG. 14, or any aspect related to it.

The one or more processors 1610 include circuitry configured to implement (e.g., execute) the code stored in the computer-readable medium/memory 1640, including circuitry for receiving 1615, circuitry for sending 1620, circuitry for ignoring 1625, circuitry for establishing 1630, and circuitry for refraining 1635. Processing with circuitry 1615-1635 may enable and cause the communications device 1600 to perform the method 1400 described with respect to FIG. 14, or any aspect related to it.

More generally, means for communicating, transmitting, sending or outputting for transmission may include the transceivers 354, antenna(s) 352, transmit processor 364, TX MIMO processor 366, AI processor 370, and/or controller/processor 380 of the UE 104 illustrated in FIG. 3, transceiver 1675 and/or antenna 1680 of the communications device 1600 in FIG. 16, and/or one or more processors 1610 of the communications device 1600 in FIG. 16. Means for communicating, receiving or obtaining may include the transceivers 354, antenna(s) 352, receive processor 358, AI processor 370, and/or controller/processor 380 of the UE 104 illustrated in FIG. 3, transceiver 1675 and/or antenna 1680 of the communications device 1600 in FIG. 16, and/or one or more processors 1610 of the communications device 1600 in FIG. 16.

FIG. 17 depicts aspects of an example communications device 1700. In some aspects, communications device 1700 is a network entity, such as BS 102 of FIGS. 1 and 3, or a disaggregated base station as discussed with respect to FIG. 2.

The communications device 1700 includes a processing system 1705 coupled to a transceiver 1745 (e.g., a transmitter and/or a receiver) and/or a network interface 1755. The transceiver 1745 is configured to transmit and receive signals for the communications device 1700 via an antenna 1750, such as the various signals as described herein. The network interface 1755 is configured to obtain and send signals for the communications device 1700 via communications link(s), such as a backhaul link, midhaul link, and/or fronthaul link as described herein, such as with respect to FIG. 2. The processing system 1705 may be configured to perform processing functions for the communications device 1700, including processing signals received and/or to be transmitted by the communications device 1700.

The processing system 1705 includes one or more processors 1710. In various aspects, one or more processors 1710 may be representative of one or more of receive processor 338, transmit processor 320, TX MIMO processor 330, and/or controller/processor 340, as described with respect to FIG. 3. The one or more processors 1710 are coupled to a computer-readable medium/memory 1725 via a bus 1740. In certain aspects, the computer-readable medium/memory 1725 is configured to store instructions (e.g., computer-executable code) that when executed by the one or more processors 1710, enable and cause the one or more processors 1710 to perform the method 1500 described with respect to FIG. 15, or any aspect related to it, including any operations described in relation to FIG. 15. Note that reference to a processor of communications device 1700 performing a function may include one or more processors of communications device 1700 performing that function, such as in a distributed fashion.

In the depicted example, the computer-readable medium/memory 1725 stores code for sending 1730 and code for receiving 1735. Processing of the code for sending 1730 and code for receiving 1735 may enable and cause the communications device 1700 to perform the method 1500 described with respect to FIG. 15, or any aspect related to it.

The one or more processors 1710 include circuitry configured to implement (e.g., execute) the code stored in the computer-readable medium/memory 1725, including circuitry for sending 1715 and circuitry for receiving 1720. Processing with circuitry for sending 1715 and circuitry for receiving 1720 may enable and cause the communications device 1700 to perform the method 1500 described with respect to FIG. 15, or any aspect related to it.

More generally, means for communicating, transmitting, sending or outputting for transmission may include the transceivers 332, antenna(s) 334, transmit processor 320, TX MIMO processor 330, AI processor 318, and/or controller/processor 340 of the BS 102 illustrated in FIG. 3, transceiver 1745, antenna 1750, and/or network interface 1755 of the communications device 1700 in FIG. 17, and/or one or more processors 1710 of the communications device 1700 in FIG. 17. Means for communicating, receiving or obtaining may include the transceivers 332, antenna(s) 334, receive processor 338, AI processor 318, and/or controller/processor 340 of the BS 102 illustrated in FIG. 3, transceiver 1745, antenna 1750, and/or network interface 1755 of the communications device 1700 in FIG. 17, and/or one or more processors 1710 of the communications device 1700 in FIG. 17.

Example Clauses

Implementation examples are described in the following numbered clauses:

Clause 1: A method for wireless communications by an apparatus comprising: receiving, in a first anchor cell of a first network entity, a first configuration for an OD-SIB1 procedure in a non-anchor cell, wherein the first configuration is common to a first plurality of non-anchor cells supporting OD-SIB1 transmission; sending, in a first non-anchor cell of the first plurality of non-anchor cells, a request to send an OD-SIB1 based at least in part on the first configuration; and receiving, in the first non-anchor cell, the OD-SIB1 based at least in part on the first configuration.

Clause 2: The method of Clause 1, wherein a plurality of non-anchor cells, including the first non-anchor cell, correspond to a same frequency.

Clause 3: The method of any one of Clauses 1-2, wherein: a first coverage area associated with each of the first plurality of non-anchor cells overlaps a second coverage area associated with the first anchor cell, and the second coverage area covers a geographic location of the apparatus.

Clause 4: The method of Clause 3, further comprising: receiving, in a second anchor cell, a second configuration for the OD-SIB1 procedure in the non-anchor cell based at least in part on a relocation of the apparatus from within the second coverage area to within a third coverage area associated with the second anchor cell, wherein: the second configuration is common to a second plurality of non-anchor cells supporting OD-SIB1 transmission, and a fourth coverage area associated with each of the second plurality of non-anchor cells overlaps the third coverage area associated with the second anchor cell.

Clause 5: The method of any one of Clauses 1-4, wherein first coverage areas associated with the first plurality of non-anchor cells overlap second coverage areas associated with a first plurality of anchor cells, including the first anchor cell.

Clause 6: The method of Clause 5, wherein each of the first plurality of anchor cells is associated with a same first cell group, comprising: an OD-SIB1 anchor cell group; a paging cell group; or a cell group associated with a first tracking area.

Clause 7: The method of Clause 6, further comprising receiving, in a second anchor cell associated with a second cell group, a second configuration for the OD-SIB1 procedure in the non-anchor cell based at least in part on a relocation of the apparatus from within one of the second coverage areas to within a third coverage area associated with the second anchor cell.

Clause 8: The method of any one of Clauses 1-7, wherein the first configuration comprises at least one of: a second configuration associated with SSBs reception in the first plurality of non-anchor cells; a third configuration for sending one or more OD-SIB1 requests, including the request to send the OD-SIB1; a fourth configuration for receiving one or more OD-SIB1s, including the OD-SIB1; or a fifth configuration for sending HARQ ACK or NACK feedback in response to the one or more OD-SIB1s.

Clause 9: The method of any one of Clauses 1-8, wherein the first configuration comprises: an indication of a downlink BWP to use for performing an OD-SIB1 reception; and one or more occasions configured for receiving DCI scheduling one or more OD-SIB1s during the OD-SIB1 reception, including the OD-SIB1.

Clause 10: The method of Clause 9, wherein the OD-SIB1 comprises a unicast transmission.

Clause 11: The method of any one of Clauses 1-10, wherein the first configuration comprises one or more parameters associated with SSBs received in the first plurality of non-anchor cells.

Clause 12: The method of any one of Clauses 1-11, further comprising receiving, in the first non-anchor cell, an SSB comprising an indication of at least one of: a downlink BWP to use for performing an OD-SIB1 reception; or one or more occasions configured for receiving DCI scheduling one or more OD-SIB1s during the OD-SIB1 reception, including the OD-SIB1.

Clause 13: The method of Clause 12, wherein the OD-SIB1 comprises a unicast transmission or a broadcast transmission.

Clause 14: The method of any one of Clauses 1-13, wherein the first configuration comprises: an indication of an uplink BWP to use for performing a RACH procedure for sending OD-SIB1 requests; a plurality of ROs configured for sending the OD-SIB1 requests during the RACH procedure, including the request to send the OD-SIB1; and one or more parameters for the RACH procedure.

Clause 15: The method of Clause 14, wherein the first configuration further comprises: a plurality of SSB occasions configured for receiving a set of SSBs in one or more SSB bursts in the first plurality of non-anchor cells; and a mapping between the plurality of SSB occasions and the plurality of ROs.

Clause 16: The method of Clause 14, wherein sending, in the first non-anchor cell, the request to send the OD-SIB1, comprises sending the request via a random access preamble used to initiate the RACH procedure.

Clause 17: The method of Clause 16, wherein: the one or more parameters for the RACH procedure comprise a configured PRACH root sequence index, and a root sequence index of the random access preamble is based at least in part on the configured PRACH root sequence index parameter and a cell identifier of the first non-anchor cell.

Clause 18: The method of Clause 16, wherein: the one or more parameters for the RACH procedure comprise a configured random access preamble index parameter, and a preamble index of the random access preamble is based at least in part on the configured random access preamble index parameter and a cell identifier of the first non-anchor cell.

Clause 19: The method of Clause 16, wherein: the one or more parameters for the RACH procedure comprise one or more configured FDRA parameters, and a starting frequency of a resource used for sending the random access preamble is based at least in part on the one or more configured FDRA parameters and a cell identifier of the first non-anchor cell.

Clause 20: The method of any one of Clauses 1-19, further comprising: receiving, in the first non-anchor cell, an SSB comprising a MIB with a cell barred field set to barred; and ignoring the cell barred field set to barred, and wherein the request to send the OD-SIB1 is sent based at least in part on ignoring the cell barred field.

Clause 21: The method of Clause 20, wherein the apparatus comprises a UE configured to support the OD-SIB1 procedure in the non-anchor cell.

Clause 22: The method of any one of Clauses 1-21, wherein: the OD-SIB1 comprises a cell barred field set to not barred, and the method further comprises establishing a RRC connection with the first network entity in the first non-anchor cell.

Clause 23: The method of any one of Clauses 1-22, wherein: the OD-SIB1 comprises a cell barred field set to barred, and the method further comprises: receiving an indication to establish an RRC connection with the first network entity; and refraining from establishing the RRC connection with the first network entity in the first non-anchor cell based at least in part on the OD-SIB1 comprising the cell barred field set to barred.

Clause 24: A method for wireless communications by an apparatus comprising: sending, in a first anchor cell of the apparatus, a first configuration for an OD-SIB1 procedure in a non-anchor cell, wherein the first configuration is common to a first plurality of non-anchor cells supporting OD-SIB1 transmission; receiving, in a first non-anchor cell of the first plurality of non-anchor cells and associated with the apparatus, a request to send an OD-SIB1 based at least in part on the first configuration; and sending, in the first non-anchor cell, the OD-SIB1 based at least in part on the first configuration.

Clause 25: The method of Clause 24, wherein a plurality of non-anchor cells, including the first non-anchor cell, correspond to a same frequency.

Clause 26: The method of any one of Clauses 24-25, wherein a first coverage area associated with each of the first plurality of non-anchor cells overlaps a second coverage area associated with the first anchor cell.

Clause 27: The method of any one of Clauses 24-26, wherein first coverage areas associated with the first plurality of non-anchor cells overlap second coverage areas associated with a first plurality of anchor cells, including the first anchor cell.

Clause 28: The method of Clause 27, wherein each of the first plurality of anchor cells is associated with a same first cell group, comprising: an OD-SIB1 anchor cell group; a paging cell group; or a cell group associated with a first tracking area.

Clause 29: The method of any one of Clauses 24-28, wherein the first configuration comprises at least one of: a second configuration associated with SSBs transmission in the first plurality of non-anchor cells; a third configuration for receiving one or more OD-SIB1 requests, including the request to send the OD-SIB1; a fourth configuration for transmitting one or more OD-SIB1s, including the OD-SIB1; or a fifth configuration for receiving HARQ ACK or NACK feedback in response to the one or more OD-SIB1s.

Clause 30: The method of any one of Clauses 24-29, wherein the first configuration comprises: an indication of a downlink BWP associated with an OD-SIB1 transmission; and one or more occasions configured for sending DCI scheduling one or more OD-SIB1s during the OD-SIB1 transmission, including the OD-SIB1.

Clause 31: The method of Clause 30, wherein the OD-SIB1 comprises a unicast transmission.

Clause 32: The method of any one of Clauses 24-31, wherein the first configuration comprises one or more parameters associated with SSBs transmitted in the first plurality of non-anchor cells.

Clause 33: The method of any one of Clauses 24-32, further comprising sending, in the first non-anchor cell, an SSB comprising an indication of at least one of: a downlink BWP associated with an OD-SIB1 transmission; or one or more occasions configured for sending DCI scheduling one or more OD-SIB1s during the OD-SIB1 transmission, including the OD-SIB1.

Clause 34: The method of Clause 33, wherein the OD-SIB1 comprises a unicast transmission or a broadcast transmission.

Clause 35: The method of any one of Clauses 24-34, wherein the first configuration comprises: an indication of an uplink BWP to use for performing a RACH procedure for receiving OD-SIB1 requests; a plurality of ROs configured for receiving the OD-SIB1 requests during the RACH procedure, including the request to send the OD-SIB1; and one or more parameters for the RACH procedure.

Clause 36: The method of Clause 35, wherein the first configuration further comprises: a plurality of SSB occasions configured for sending a set of SSBs in one or more SSB bursts in the first plurality of non-anchor cells; and a mapping between the plurality of SSB occasions and the plurality of ROs.

Clause 37: The method of Clause 35, wherein receiving, in the first non-anchor cell, the request to send the OD-SIB1, comprises receiving the request via a random access preamble used to initiate the RACH procedure.

Clause 38: The method of Clause 37, wherein: the one or more parameters for the RACH procedure comprise a configured PRACH root sequence index, and a root sequence index of the random access preamble is based at least in part on the configured PRACH root sequence index parameter and a cell identifier of the first non-anchor cell.

Clause 39: The method of Clause 37, wherein: the one or more parameters for the RACH procedure comprise a configured random access preamble index parameter, and a preamble index of the random access preamble is based at least in part on the configured random access preamble index parameter and a cell identifier of the first non-anchor cell.

Clause 40: The method of Clause 37, wherein: the one or more parameters for the RACH procedure comprise one or more configured FDRA parameters, and a starting frequency of a resource associated with the random access preamble is based at least in part on the one or more configured FDRA parameters and a cell identifier of the first non-anchor cell.

Clause 41: The method of any one of Clauses 24-40, further comprising sending, on the first non-anchor cell, an SSB comprising a MIB with a cell barred field set to barred.

Clause 42: The method of any one of Clauses 24-41, wherein the OD-SIB1 comprises a cell barred field set to not barred.

Clause 43: One or more apparatuses, comprising: one or more memories comprising executable instructions; and one or more processors configured to execute the executable instructions and cause the one or more apparatuses to perform a method in accordance with any one of Clauses 1-42.

Clause 44: One or more apparatuses, comprising: one or more memories; and one or more processors, coupled to the one or more memories, configured to cause the one or more apparatuses to perform a method in accordance with any one of Clauses 1-42.

Clause 45: One or more apparatuses, comprising: one or more memories; and one or more processors, coupled to the one or more memories, configured to perform a method in accordance with any one of Clauses 1-42.

Clause 46: One or more apparatuses, comprising means for performing a method in accordance with any one of Clauses 1-42.

Clause 47: One or more non-transitory computer-readable media comprising executable instructions that, when executed by one or more processors of one or more apparatuses, cause the one or more apparatuses to perform a method in accordance with any one of Clauses 1-42.

Clause 48: One or more computer program products embodied on one or more computer-readable storage media comprising code for performing a method in accordance with any one of Clauses 1-42.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining and the like. Also, “determining” may include receiving (e.g., receiving information), accessing (e.g., accessing data in a memory) and the like. Also, “determining” may include resolving, selecting, choosing, establishing and the like.

As used herein, “coupled to” and “coupled with” generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:
- one or more memories; and
- one or more processors coupled to the one or more memories, the one or more processors being configured to cause the apparatus to:
  - receive, in a first anchor cell of a first network entity, a first configuration for an on demand system information block 1 (OD-SIB1) procedure in a non-anchor cell, wherein the first configuration is common to a first plurality of non-anchor cells supporting OD-SIB1 transmission;
  - send, in a first non-anchor cell of the first plurality of non-anchor cells, a request to send an OD-SIB1 based at least in part on the first configuration; and
  - receive, in the first non-anchor cell, the OD-SIB1 based at least in part on the first configuration.

2. The apparatus of claim 1, wherein a plurality of non-anchor cells, including the first non-anchor cell, correspond to a same frequency.

3. The apparatus of claim 1, wherein:
- a first coverage area associated with each of the first plurality of non-anchor cells overlaps a second coverage area associated with the first anchor cell, and
- the second coverage area covers a geographic location of the apparatus.

4. The apparatus of claim 3, wherein:
- the one or more processors are configured to cause the apparatus to receive, in a second anchor cell, a second configuration for the OD-SIB1 procedure in the non-anchor cell based at least in part on a relocation of the apparatus from within the second coverage area to within a third coverage area associated with the second anchor cell,
- the second configuration is common to a second plurality of non-anchor cells supporting OD-SIB1 transmission, and
- a fourth coverage area associated with each of the second plurality of non-anchor cells overlaps the third coverage area associated with the second anchor cell.

5. The apparatus of claim 1, wherein first coverage areas associated with the first plurality of non-anchor cells overlap second coverage areas associated with a first plurality of anchor cells, including the first anchor cell.

6. The apparatus of claim 5, wherein each of the first plurality of anchor cells is associated with a same first cell group, comprising:
- an OD-SIB1 anchor cell group;
- a paging cell group; or
- a cell group associated with a first tracking area.

7. The apparatus of claim 6, wherein the one or more processors are configured to cause the apparatus to:
- receive, in a second anchor cell associated with a second cell group, a second configuration for the OD-SIB1 procedure in the non-anchor cell based at least in part on a relocation of the apparatus from within one of the second coverage areas to within a third coverage area associated with the second anchor cell.

8. The apparatus of claim 1, wherein the first configuration comprises at least one of:
- a second configuration associated with synchronization signal blocks (SSBs) reception in the first plurality of non-anchor cells;
- a third configuration for sending one or more OD-SIB1 requests, including the request to send the OD-SIB1;
- a fourth configuration for receiving one or more OD-SIB1s, including the OD-SIB1; or
- a fifth configuration for sending hybrid automatic repeat request (HARQ) acknowledgement (ACK) or negative ACK (NACK) feedback in response to the one or more OD-SIB1s.

9. The apparatus of claim 1, wherein:
- the OD-SIB1 comprises a unicast transmission, and
- the first configuration comprises:
  - an indication of a downlink bandwidth part (BWP) to use for performing an OD-SIB1 reception; and
  - one or more occasions configured for receiving downlink control information (DCI) scheduling one or more OD-SIB1s during the OD-SIB1 reception, including the OD-SIB1.

10. The apparatus of claim 1, wherein the first configuration comprises one or more parameters associated with SSBs received in the first plurality of non-anchor cells.

11. The apparatus of claim 1, wherein:
- the OD-SIB1 comprises a unicast transmission or a broadcast transmission, and the one or more processors are configured to cause the apparatus to receive, in the first non-anchor cell, an SSB comprising an indication of at least one of:

a downlink BWP to use for performing an OD-SIB1 reception; or one or more occasions configured for receiving downlink control information (DCI) scheduling one or more OD-SIB1s during the OD-SIB1 reception, including the OD-SIB1.

12. The apparatus of claim 1, wherein the first configuration comprises:

an indication of an uplink bandwidth part (BWP) to use for performing a RACH procedure for sending OD-SIB1 requests;

a plurality of RACH occasions (ROs) configured for sending the OD-SIB1 requests during the RACH procedure, including the request to send the OD-SIB1; and one or more parameters for the RACH procedure.

13. The apparatus of claim 12, wherein the first configuration further comprises:

a plurality of SSB occasions configured for receiving a set of SSBs in one or more SSB bursts in the first plurality of non-anchor cells; and a mapping between the plurality of SSB occasions and the plurality of ROs.

14. The apparatus of claim 12, wherein to send, in the first non-anchor cell, the request to send the OD-SIB1, the one or more processors are configured to cause the apparatus to send the request via a random access preamble used to initiate the RACH procedure.

15. The apparatus of claim 14, wherein:

the one or more parameters for the RACH procedure comprise a configured physical RACH (PRACH) root sequence index, and a root sequence index of the random access preamble is based at least in part on the configured PRACH root sequence index parameter and a cell identifier of the first non-anchor cell; or the one or more parameters for the RACH procedure comprise a configured random access preamble index parameter, and a preamble index of the random access preamble is based at least in part on the configured random access preamble index parameter and a cell identifier of the first non-anchor cell; or the one or more parameters for the RACH procedure comprise one or more configured frequency domain resource allocation (FDRA) parameters, and a starting frequency of a resource used for sending the random access preamble is based at least in part on the one or more configured FDRA parameters and a cell identifier of the first non-anchor cell.

16. The apparatus of claim 1, wherein:

the one or more processors are configured to cause the apparatus to:

receive, in the first non-anchor cell, an SSB comprising a master information block (MIB) with a cell barred field set to barred; and ignore the cell barred field set to barred, and the one or more processors are configured to cause the apparatus to send the request to send the OD-SIB1 based at least in part on ignoring the cell barred field.

17. The apparatus of claim 1, wherein:

the OD-SIB1 comprises a cell barred field set to not barred, and the one or more processors are configured to cause the apparatus to establish a radio resource control (RRC) connection with the first network entity in the first non-anchor cell.

18. The apparatus of claim 1, wherein:

the OD-SIB1 comprises a cell barred field set to barred, and the one or more processors are configured to cause the apparatus to:

receive an indication to establish an RRC connection with the first network entity; and refrain from establishing the RRC connection with the first network entity in the first non-anchor cell based at least in part on the OD-SIB1 comprising the cell barred field set to barred.

19. An apparatus configured for wireless communications, comprising:

one or more memories; and one or more processors coupled to the one or more memories, the one or more processors being configured to cause the apparatus to:

send, in a first anchor cell of the apparatus, a first configuration for an on demand system information block 1 (OD-SIB1) procedure in a non-anchor cell, wherein the first configuration is common to a first plurality of non-anchor cells supporting OD-SIB1 transmission;

receive, in a first non-anchor cell of the first plurality of non-anchor cells and associated with the apparatus, a request to send an OD-SIB1 based at least in part on the first configuration; and send, in the first non-anchor cell, the OD-SIB1 based at least in part on the first configuration.

20. A method for wireless communications by an apparatus comprising:

receiving, in a first anchor cell of a first network entity, a first configuration for an on demand system information block 1 (OD-SIB1) procedure in a non-anchor cell, wherein the first configuration is common to a first plurality of non-anchor cells supporting OD-SIB1 transmission;

sending, in a first non-anchor cell of the first plurality of non-anchor cells, a request to send an OD-SIB1 based at least in part on the first configuration; and receiving, in the first non-anchor cell, the OD-SIB1 based at least in part on the first configuration.

* * * * *